June 26, 1956  O. E. KASE  2,751,985

FIELD SELECTION MECHANISM FOR RECORD CONTROLLED MACHINES

Filed Dec. 5, 1952  12 Sheets-Sheet 1

INVENTOR.
OTTO E. KASE
BY
ATTORNEYS

INVENTOR.
OTTO E. KASE
BY
ATTORNEYS

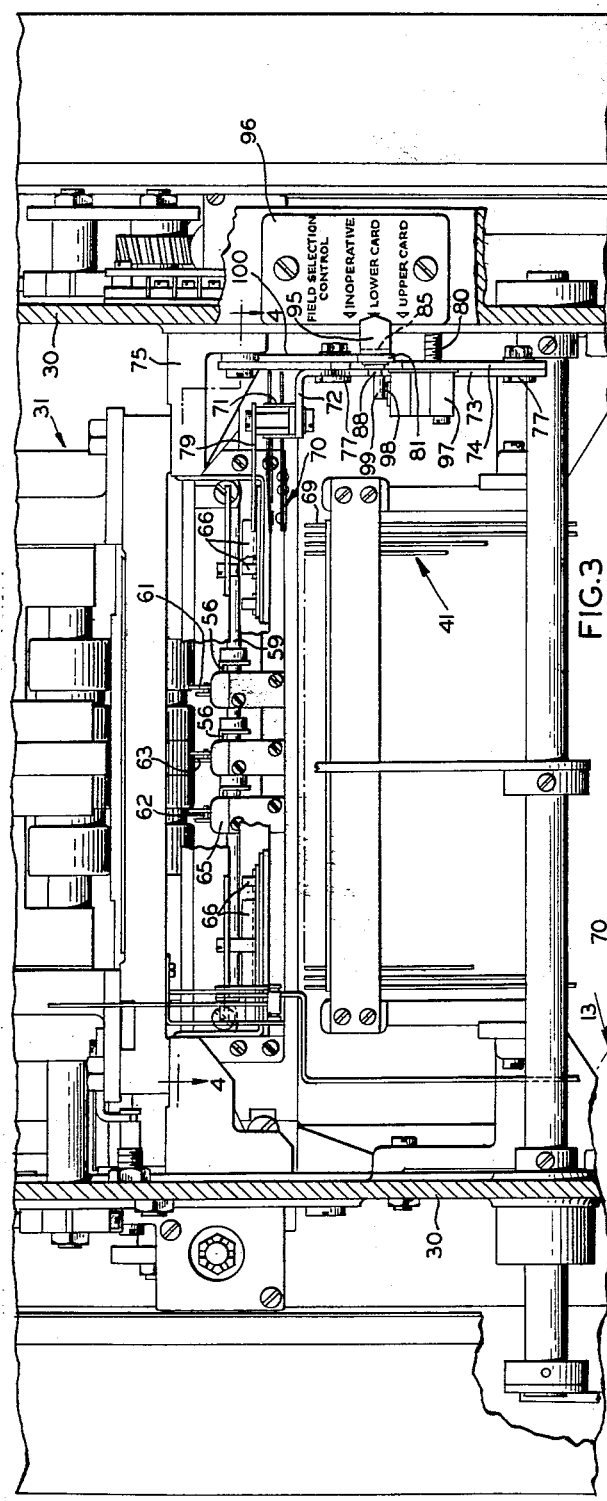
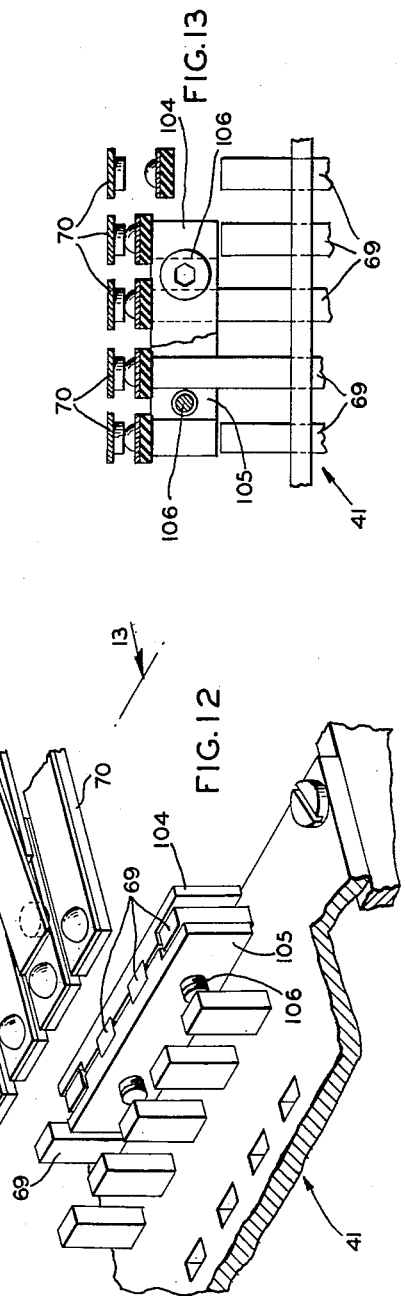
INVENTOR.
OTTO E. KASE

June 26, 1956  O. E. KASE  2,751,985
FIELD SELECTION MECHANISM FOR RECORD CONTROLLED MACHINES
Filed Dec. 5, 1952  12 Sheets-Sheet 4

INVENTOR.
OTTO E. KASE
BY
ATTORNEYS

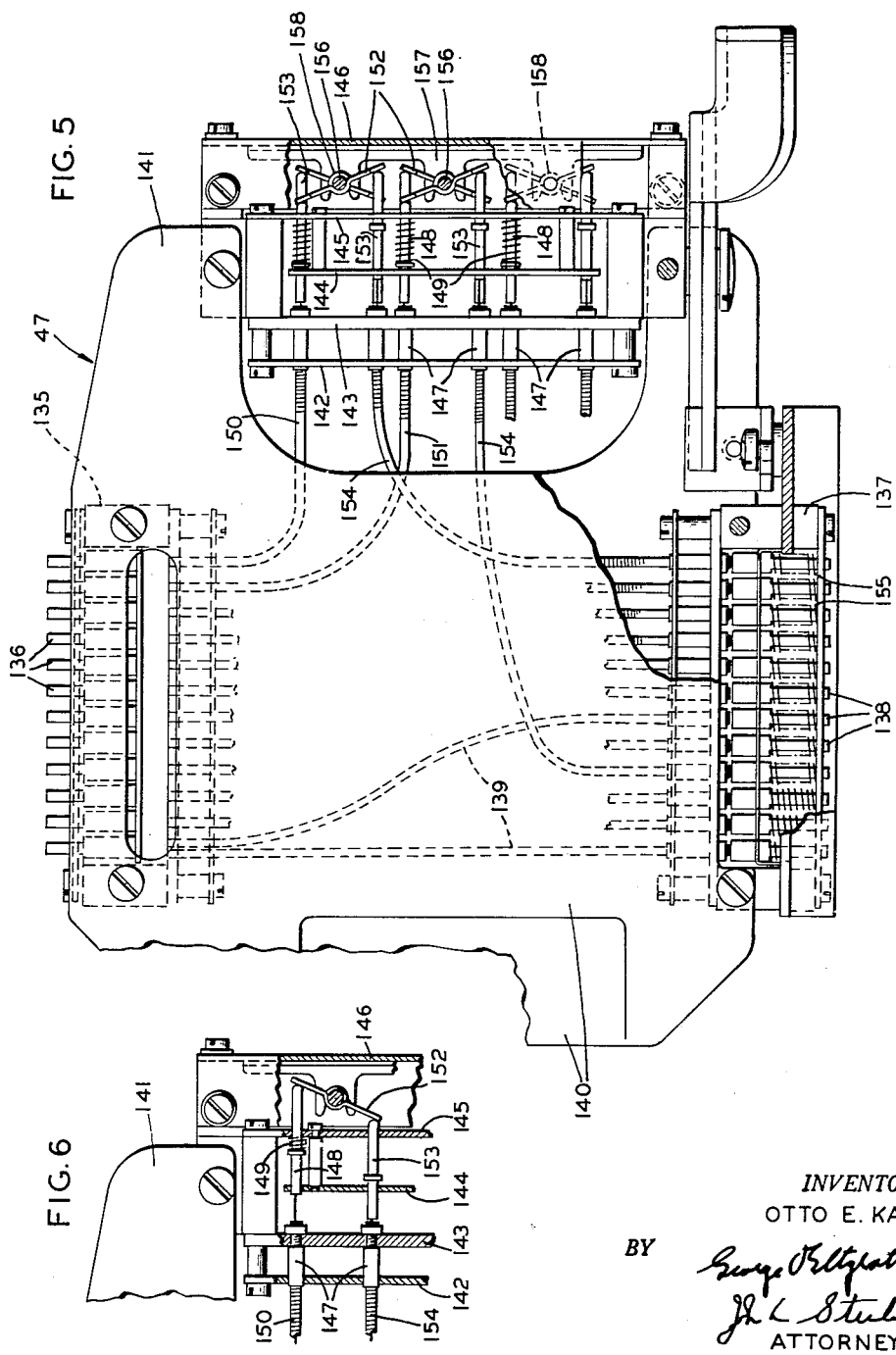

June 26, 1956     O. E. KASE     2,751,985
FIELD SELECTION MECHANISM FOR RECORD CONTROLLED MACHINES
Filed Dec. 5, 1952     12 Sheets-Sheet 6

INVENTOR.
OTTO E. KASE
BY
ATTORNEYS

June 26, 1956     O. E. KASE     2,751,985
FIELD SELECTION MECHANISM FOR RECORD CONTROLLED MACHINES
Filed Dec. 5, 1952     12 Sheets-Sheet 7
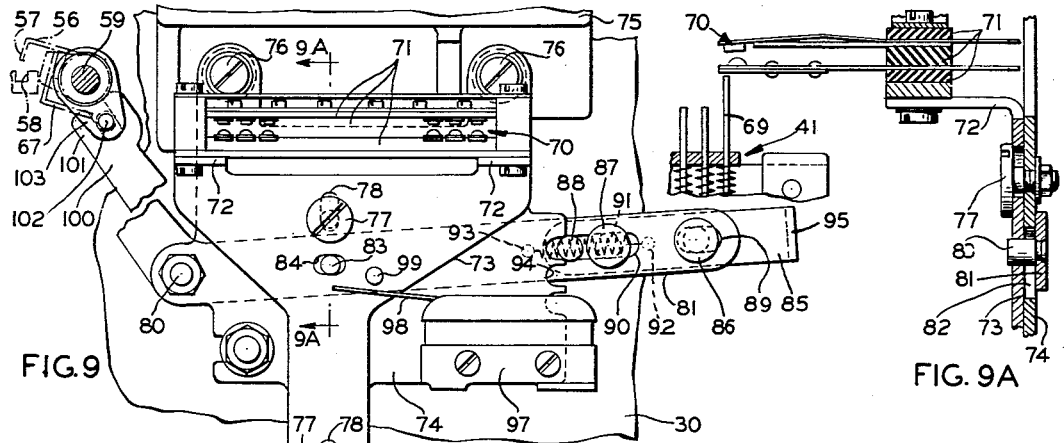
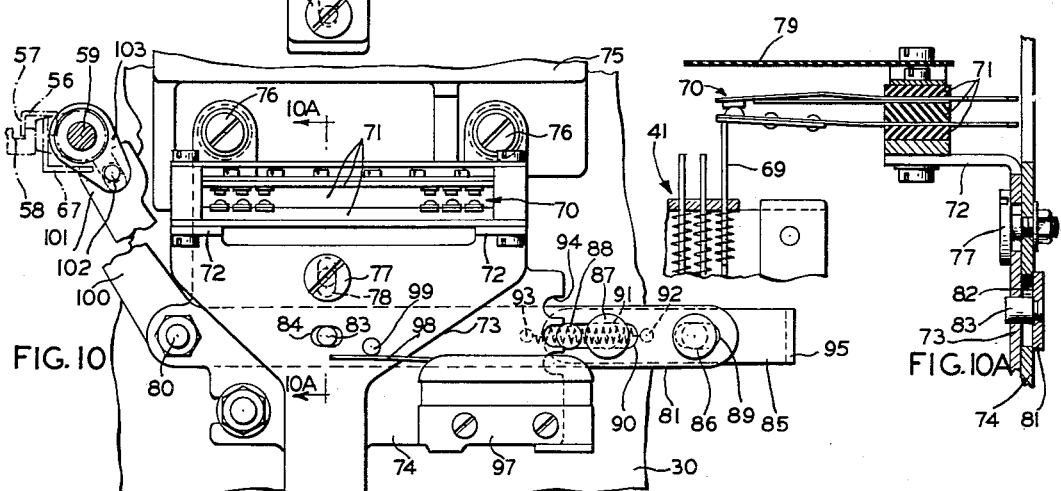
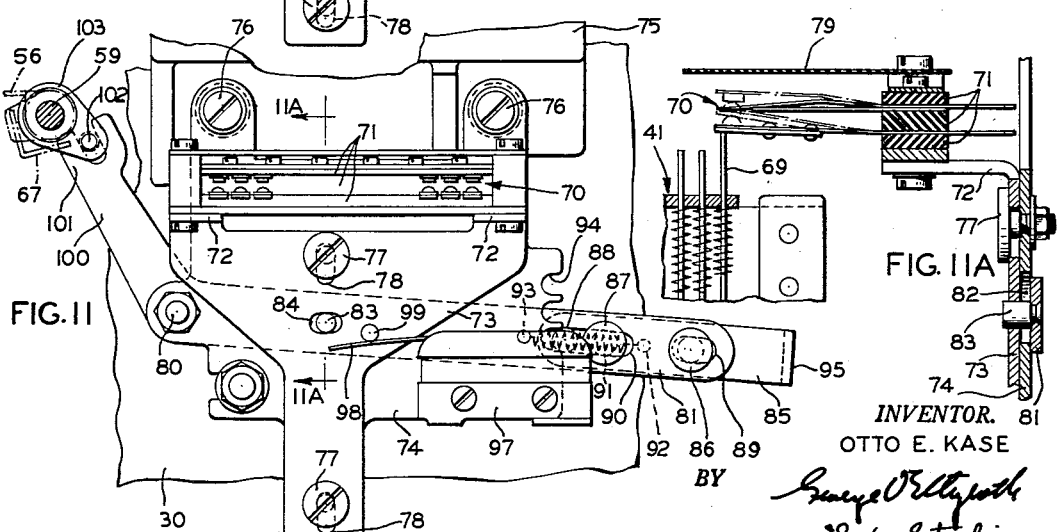
INVENTOR.
OTTO E. KASE
BY
ATTORNEYS June 26, 1956  O. E. KASE  2,751,985
FIELD SELECTION MECHANISM FOR RECORD CONTROLLED MACHINES
Filed Dec. 5, 1952  12 Sheets-Sheet 8
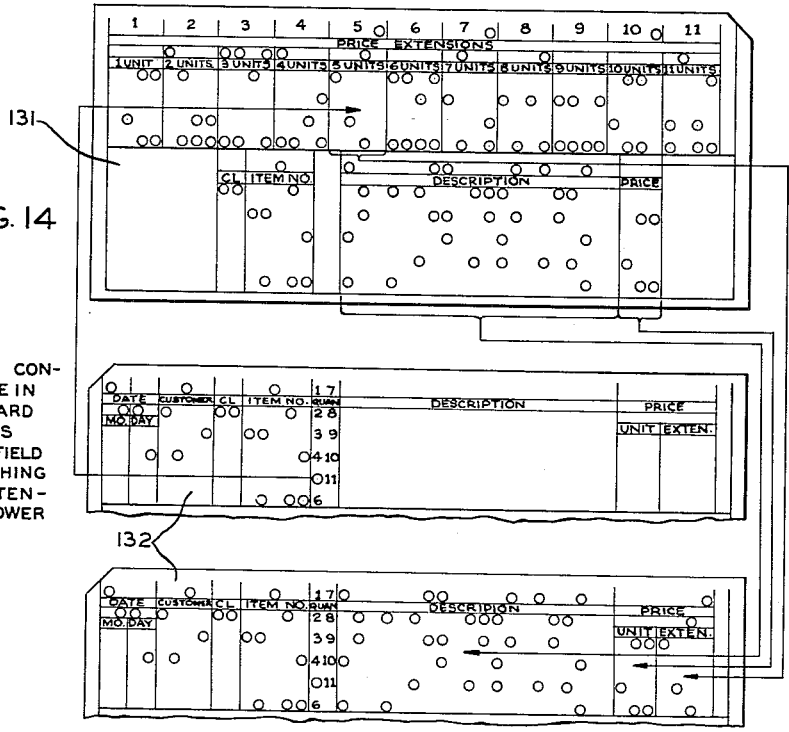
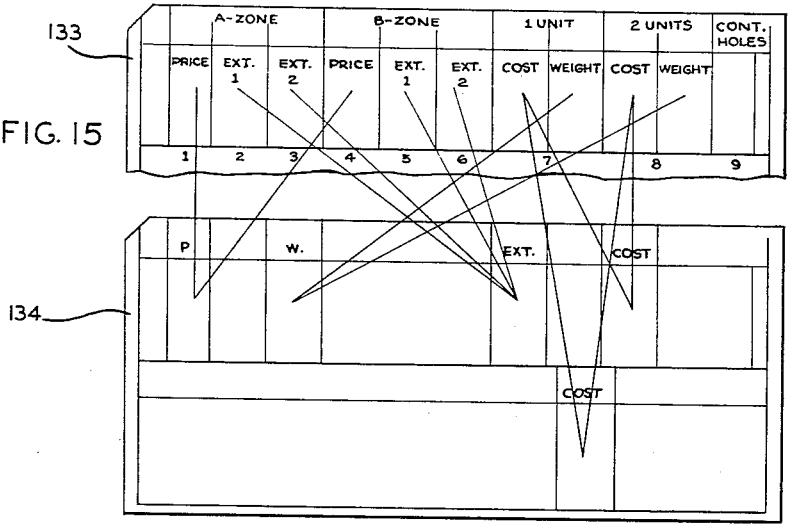
INVENTOR.
OTTO E. KASE
BY
ATTORNEYS June 26, 1956  O. E. KASE  2,751,985
FIELD SELECTION MECHANISM FOR RECORD CONTROLLED MACHINES
Filed Dec. 5, 1952  12 Sheets-Sheet 9
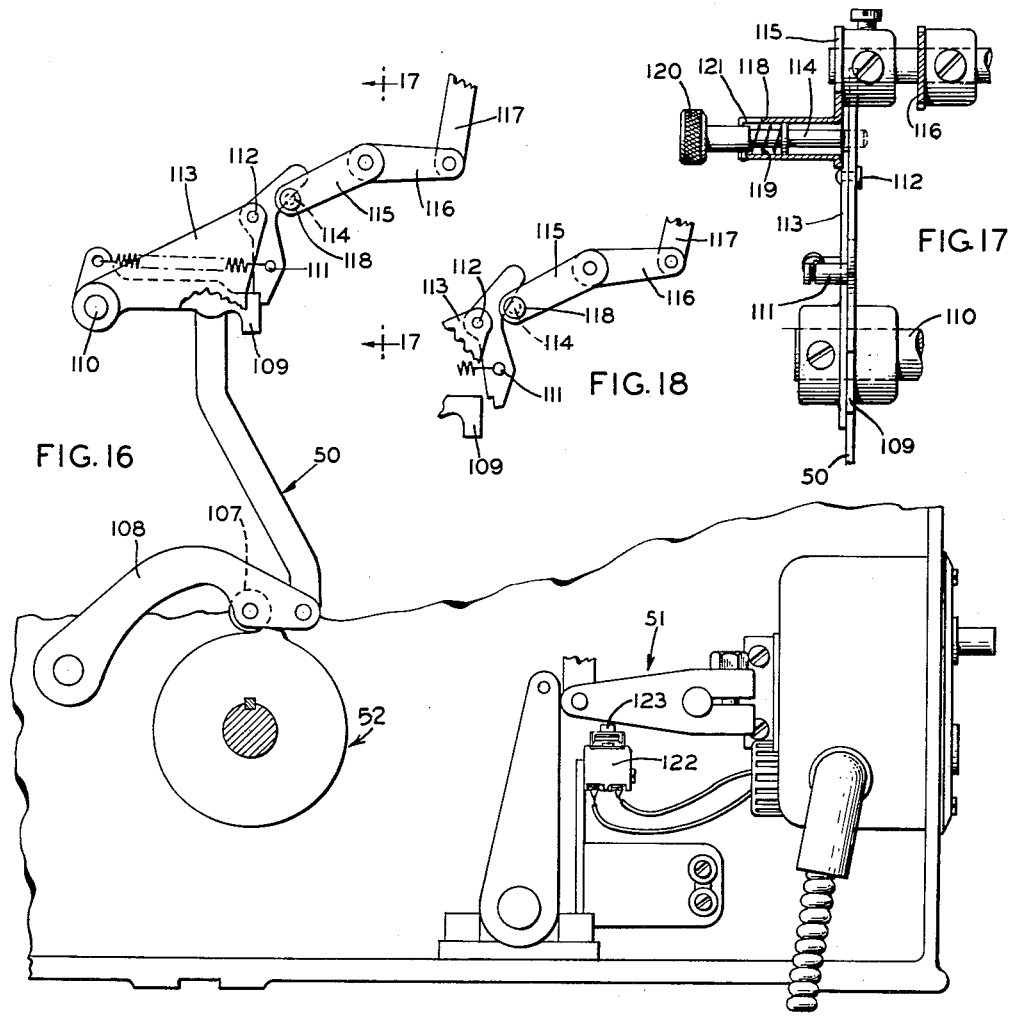
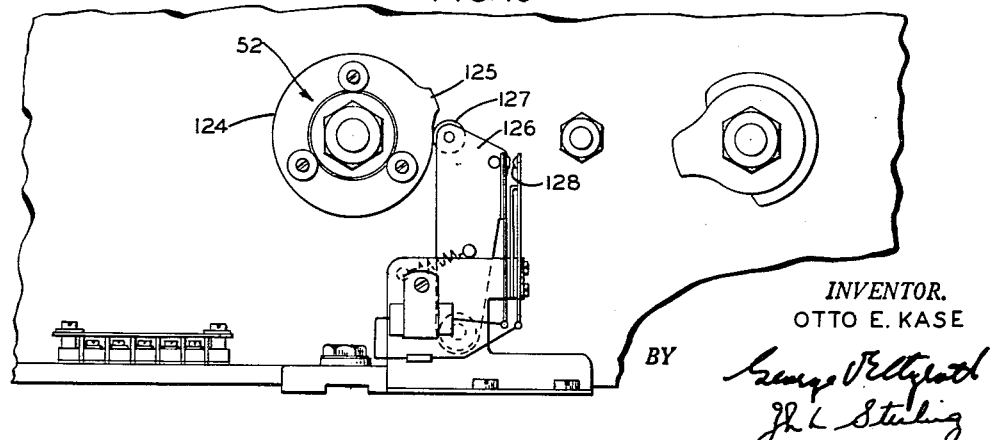
INVENTOR.
OTTO E. KASE
BY
ATTORNEYS

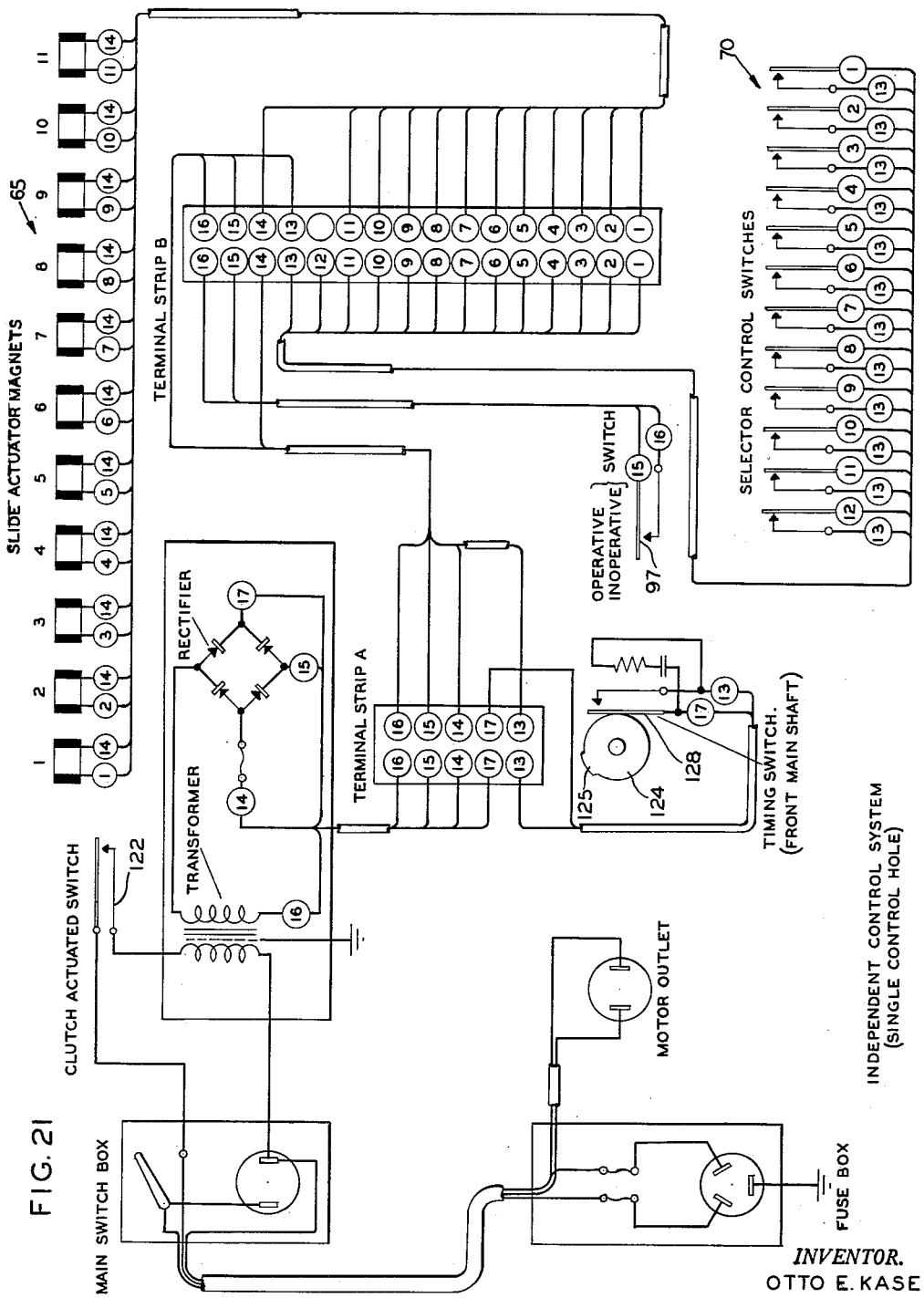

June 26, 1956  O. E. KASE  2,751,985
FIELD SELECTION MECHANISM FOR RECORD CONTROLLED MACHINES
Filed Dec. 5, 1952  12 Sheets-Sheet 11

INVENTOR.
OTTO E. KASE

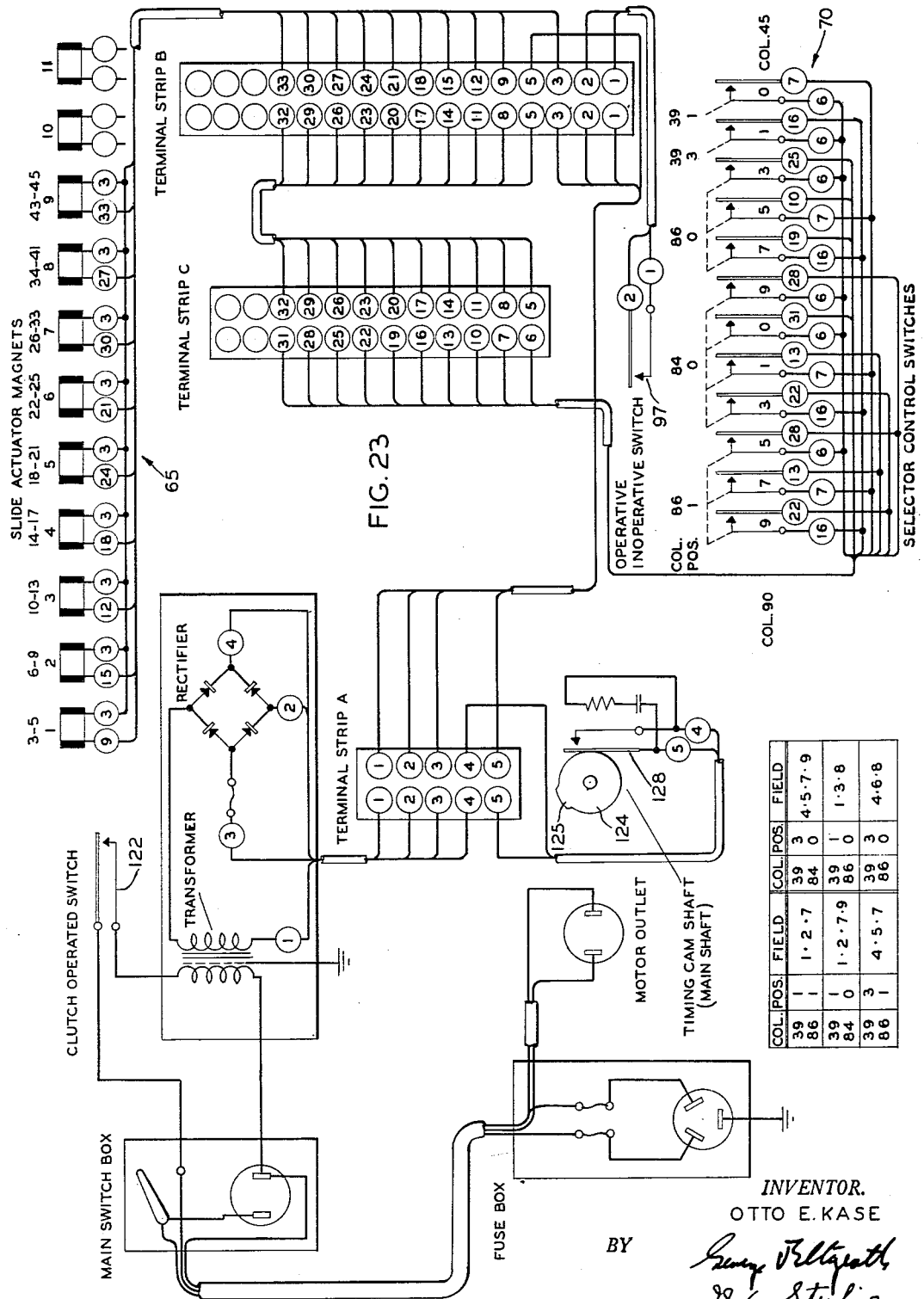

United States Patent Office 2,751,985
Patented June 26, 1956

2,751,985
FIELD SELECTION MECHANISM FOR RECORD CONTROLLED MACHINES

Otto E. Kase, Stamford, Conn., assignor to Sperry Rand Corporation, a corporation of Delaware Application December 5, 1952, Serial No. 324,313

29 Claims. (Cl. 164—115)

This invention relates to new and useful improvements in record or card controlled statistical machines such as multi-control reproducers of either the regular, the interfiling, or the collating types, or any combination thereof.

The main purpose of this invention is to permit any one or more of a number of fields, comprising designated columns of a card fed from a master card-feeding magazine, to be immediately selected by card control for reproduction in a card fed from a detail card-feeding magazine, the balance of the master card fields not being reproduced.

A further purpose of the invention is to permit the operation of the device by means of control holes in either the master card, or the detail card, or both.

Another purpose of the invention is to enable reduction in the size of master card files heretofore required and thereby speed up many procedures now in operation.

A still further purpose is to open new possibilities for the use of the interfiling reproducing punch or the collating reproducer whenever the information to be punched varies under different conditions.

Yet another purpose is to provide a simple, efficient, and reliable machine which can be used in connection with pay-roll, chain-store, and other accounting systems to facilitate the transfer, in a rapid and simple manner, of selected information from master card files to selected fields on detail cards.

Further and more specific objects, features and advantages will more clearly appear from a consideration of the specification hereinafter set forth especially when taken in connection with the accompanying drawings which illustrate a present preferred form which the invention may assume and which form part of the specification.

Briefly and in general terms the invention is embodied in a machine for transferring data from one card to another and adapted to operate with said one card divided into fields of data and having means to permit said card to remain in the machine for one or more cycles of operation, and comprises means for sensing the data of said fields, means for transferring said sensed data to the other card, and control means on either card to effect the transfer of data only from one or more selected fields of the first card to the second card.

In other language the invention involves the selection of predetermined information on one card and single or multiple reproduction of variable or partial information therefrom into one or more fields of another card by means of control means in either card.

More particularly, in the disclosed embodiment, it relates to means associated with all or part of the 45 upper half columns of the upper set-up section of a 90 column card reproducer which are divided into field selection units according to the specification of the problem or application to be operated by the individual machine. For example, there may be eleven field selection units of four columns each and the selection of one or more fields is effected by control holes in either an upper master card or a lower detail card or by control holes in both.

In the upper set-up section are two sets of slides, one set for the upper half columns and one set for the lower half columns of the master card. The set of slides for the upper half of the card are normally latched in inoperative position by means of pivoted latch plates, and each plate controls the latching or release of the slides related to a particular field section. Therefore, the latch plates may be of variable width depending upon how many columns are in the field under its control. In the assumed example, there would be four slides for each field. These latch plates are controlled by actuator magnets which, when energized, act to release the slides to enable them to lock up the set pins when the master card is sensed. Slides under field selection control will not operate unless released by the actuator magnets. All other slides in the upper set-up section may operate normally.

The actuator magnets are selectively actuated through the intermediary of a series of selector control switches or contacts collectively mounted on a common support which may be adjusted to any one of three positions. These switches or contacts may be closed by a single control pin or by combinations of one or more pins if a multiple hole code is to be employed. The control pins which operate the switches are pins in columns 45 and 90 of the comparing unit front section. The number of pins used within these two columns depends upon the type of control operation employed, which will later be described in detail. Should the field selection operation require six or less control positions on one machine, with the related comparing pins specified for field selection control confined to but one of the two columns (45 or 90), the other column may be used for other than field selection control purpose. When the field selection is made inoperative, all positions of the comparing unit are available for whatever use is desired.

The selector control switch support may be disposed in three positions as follows:

1. An upper position, in which case the switches are inoperative since the contacts are disposed above any level reached by a pin in the comparing unit whether operated by a hole in the upper master or lower detail card.

2. An intermediate position, in which case the switch contacts may be engaged by a comparing pin when operated only by a hole in the lower card since this operation involves a full pin stroke.

3. A lower position, in which case the switch contacts may be engaged by a comparing pin when operated by a hole in the upper or master card as this involves a half pin stroke. In this instance a control hole in the lower card may also be effective.

When the sensing of a control hole has caused the lifting of the proper pin or pins in the comparing unit above specified, and switches have been closed selectively and the proper actuator magnets have been energized to release the desired slides in the upper set-pin box, then the master card locking slides that are released will lock up the set-up for the desired master card field or fields, and, later in the cycle this set-up will be transferred to a particular field or fields in the detail card.

To effect this transfer of data which may be coming from any one or more fields in the master card and be going to any one or more fields in the detail card there has been provided a novel wiring unit which, in essence, is the regular wiring unit for the detail card section, to which has been attached a series of pivoted plates. These plates are pivoted on a series of horizontal shafts running across the back of the wiring unit casing. On each side of the pivot point these plates are provided with wings one of which is engaged by Bowden wires from corresponding positions of the various master card fields and the other of which is engaged by one Bowden wire leading to a corresponding position on the detail card to be punched. For example, if the master card is divided up into eleven fields of four columns each, in the pivoted plate section there would be four pivoted plates for each columnar index position, the larger wings of each connected to eleven corresponding positions in each of the master card fields through Bowden wires. The other wing of each plate would be connected by a single Bowden wire to the corresponding position in the field of the detail card to be punched. Thus there would be four plates per row with six rows of plates making a total of twenty-four plates. As will later be explained in detail, the fields may vary from three columns up to as many as can be conveniently handled, but the total number of columns included therein will not ordinarily exceed forty-four since the 45th and 90th columns of the master card are used for field selection although the control holes for field selection in the detail card may be disposed in any columns as desired, as will later be more fully explained. If any field is to be of less than three columns, it is generally desirable to wire them direct to the detail card and not employ the pivoted plates.

In the operation of this device, the field selected may be thus picked out by the use of plain numbers which are given to each field, in which case numbers up to twelve may be used and the selection made by the use of a single control hole. However, a multiple hole code may be employed for control purposes in which case control holes from one to two in number may be used. Furthermore when the zone and unit control system is employed, two control holes are employed to govern the selection of several fields in accordance with two separate control designations. These different code systems will later be explained in connection with the description of their respective circuits. These control holes are generally disposed in the detail lower card. The control holes in the master or upper card may be used, for instance, in cases where a desired field or fields on the master card are to be selected and punched into proper desired fields in a blank detail card which has no control hole in it.

The present preferred form which the invention assumes is illustrated in the drawings, of which, Figs. 1 and 2, taken together, represents a partial front-to-rear vertical cross section of the machine from the right hand side showing some of the elements of the invention in their relative position on the machine;

Fig. 3 is a partial vertical transverse section taken on the line 3—3 of Fig. 1 showing the relative position of the actuator magnets and the selector control switch, with portions broken away;

Fig. 5 is an enlarged elevation, partly broken away, of the improved punch wiring unit disposed just above the punch set-up section;

Fig. 6 is a partial section of the same wiring unit showing one of the pivoted plates in actuated position;

Figs. 9, 10, and 11 are side elevations, enlarged, of the selector control switch in various positions;

Figs. 9A, 10A, and 11A are slightly enlarged vertical sections taken on the corresponding section lines of Figs. 9, 10, and 11 respectively;

Fig. 12 is an isometric view, enlarged, of a portion of the comparing unit pins and the selector switch contacts operated thereby;

Fig. 13 is a partial section taken on the line 13—13 of Fig. 12;

Fig. 14 is a diagrammatic plan view of a master card, a detail card as punched by a customer before being placed in this machine, and the same detail card after it has been punched in accordance with "field selection" operations;

Fig. 15 is a diagrammatic plan view of a master card and a detail card showing how information from the master card may be transferred to various fields of the detail card.

Figure 20:
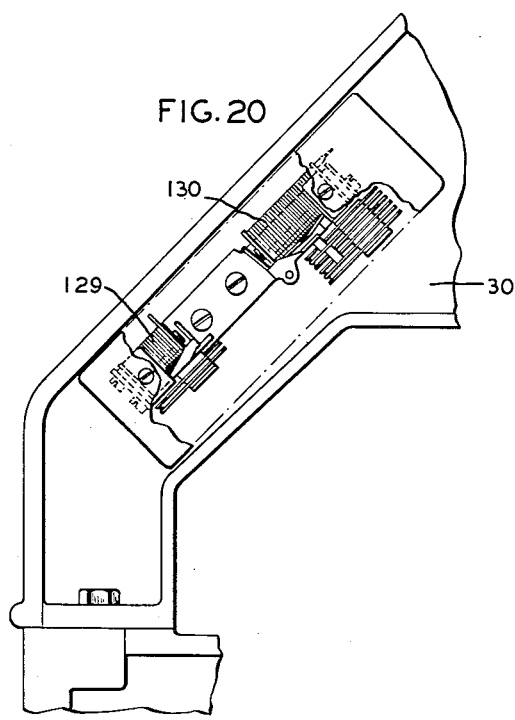
Figure 22:
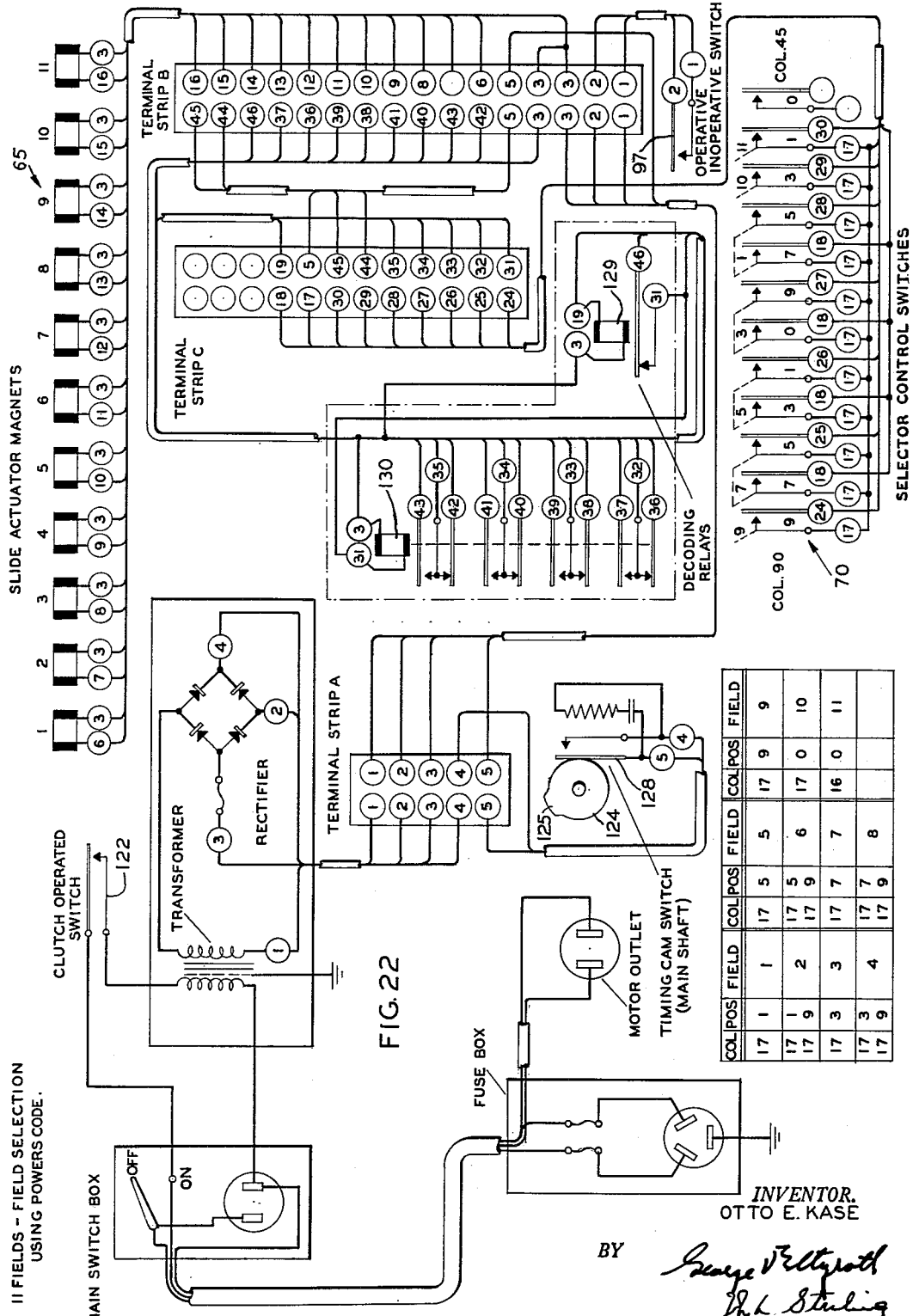

Fig. 16 is a partial elevation, of the machine from the left hand side with portions broken away, showing the retract mechanism for the master card set-up slides, with the mechanism in effective condition, and also a clutch-controlled circuit switch;

Fig. 17 is a vertical enlarged section taken on the line 17—17 of Fig. 16;

Fig. 18 is a detail of a portion of Fig. 16 showing the retract mechanism in ineffective condition;

Fig. 19 is a partial side elevation of a circuit switch operated by a timing cam on one of the main shafts of the machine;

Fig. 20 is a partial side elevation, with the frame cover removed, showing certain relays used for "field selection" when a multiple hole code is employed with respect to the control holes;

Fig. 21 is a lay-out of the circuit employed for the independent control system using a single control hole;

Fig. 22 is a lay-out of the circuit employed for the independent control system using the "Powers" two hole numeric code; and, Fig. 23 is a lay-out for a circuit employed for the zone-control system (two separate control designations).

This invention is embodied in a "Multi-Control Reproducer" or statistical comparing machine of the general type shown in U. S. patents to Braun No. 2,211,094, McDonnell 2,229,983, and 2,496,124 with particular reference to the Braun patent. Much of the present disclosure is fundamentally the same as shown in that patent and therefore detail description of similar parts herein will necessarily be brief with cross references to corresponding parts of said patent.

In machines of this type, such as the Braun patent discloses, upper level or "master" cards are run through the machine and at the same time lower level or "detail" are run through to be punched, under desired conditions, with information set-up in the master card. Generally the transfer of information from master to detail card is made when there is a so-called "match" between the two cards. This match is determined by means of a comparing mechanism shown in the Braun patent. In the machine there is also a cam control mechanism the setting of which determines the segregation or ejection of matching and non-matching cards, the retention of one or the other card in its sensing box for repeated operations, the retention of the set-up in the set-pin box for master cards and similar other controls set forth in this patent.

Referring to the drawings which illustrate the machine in which the present invention is embodied we have the following mechanisms to consider:

General construction

Figure 1:
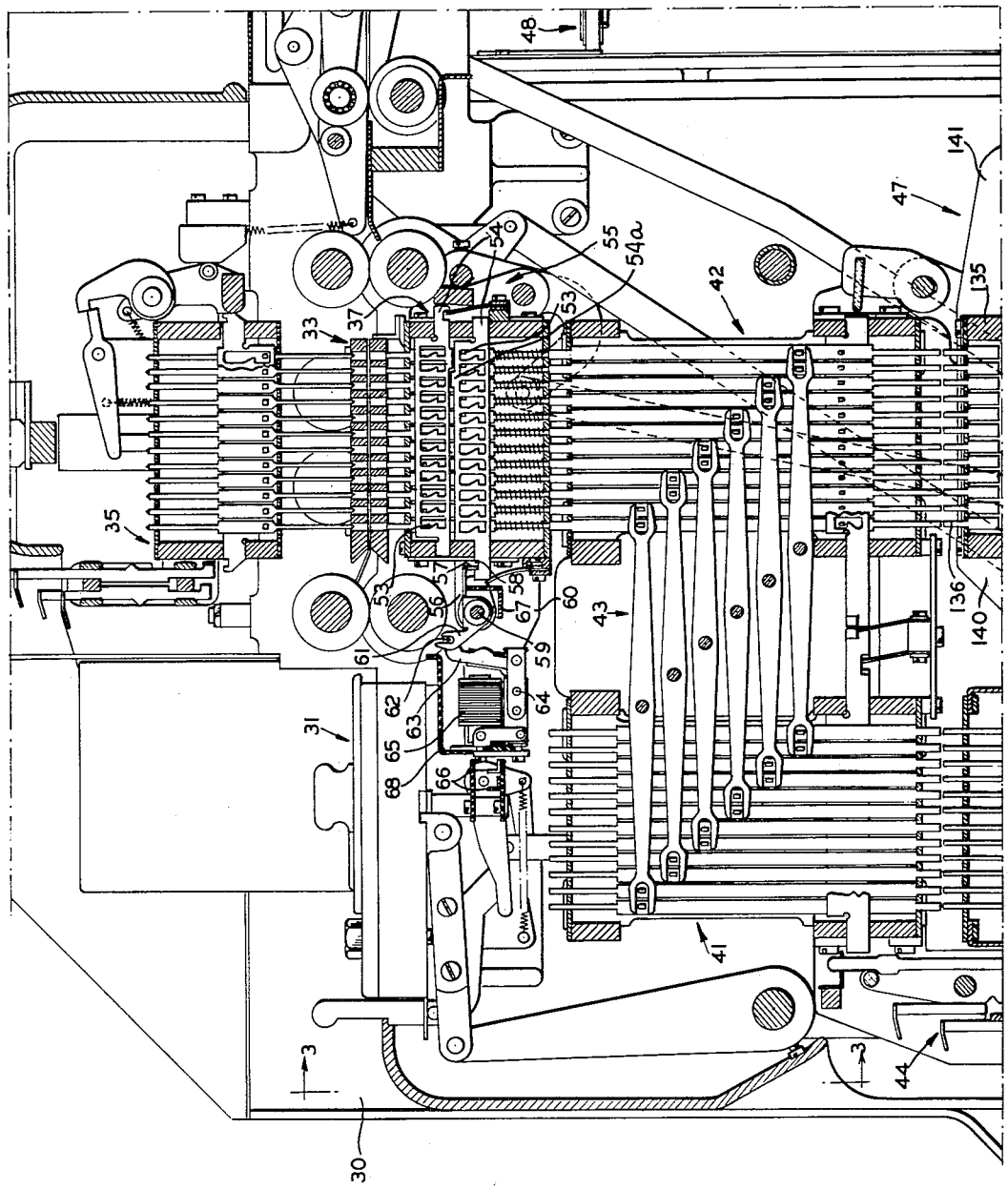
Figure 2:
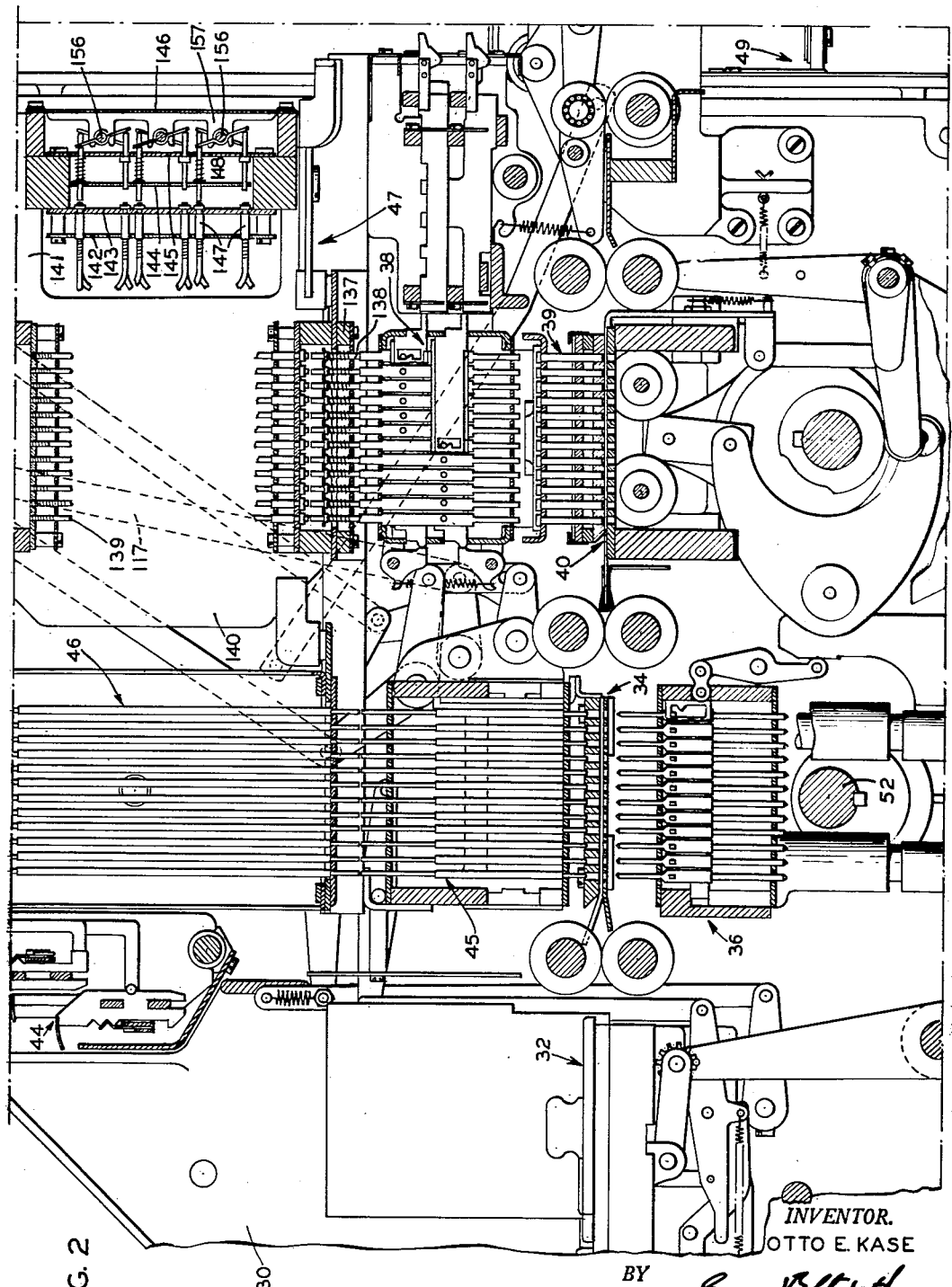

Between the side castings 30 (Figs. 1, 2 and 3 are disposed the upper and lower card magazines 31 and 32, the upper and lower card sensing chambers 33 and 34, the upper and lower reciprocable sensing pin boxes 35 and 36, the upper set-up pin section 37, the punch set up pin section 38, and the punch section 39 with the lower card punching chamber 40. There are also the front and rear comparing unit sections 41 and 42 with the connecting levers 43 and the comparing unit column control keys 44. Also to be noted are the lower detail card connecting pin section 45, the lower sensing wiring unit 46 and the punch wiring unit 47. The cards when they have passed through the machine are led into various card magazines including those indicated at 48 and 49. There may be two or more card magazines disposed at each level as desired and dependent upon the manner in which the cards are to be distributed after leaving the machine. As shown in Fig. 16 there is the usual upper or master card set pin retract mechanism 50 and the usual clutch arm and shaft 51, and in Fig. 19 is shown a main cam shaft 52. Except as herein specified these mechanisms and elements are operated separately and cooperatively in the manner generally set forth in the Braun patent above mentioned.

Upper card set-pin box

When an upper (master) card is sensed by the upper sensing pin box 35 in the usual manner it effects a set-up of pins 53 in the set-pin box 37. However in the form of box shown in Fig. 1, there is a change in that two sets of locking slides 54 are used, an upper set and a lower set. In Fig. 1 the lower slides have upstanding lugs 54a to be engaged by dependent shoulders on the associated upper slides whereby the retraction of the upper slides in the usual manner will also effect the retraction of the lower slides. In this operation the pins have extrusions to cooperate in the usual manner with the lock slides 54. The extrusions of one set of pins are associated with one set of the slides and the extrusions of the other set of pins are associated with the other set of slides. In the instant embodiment it is desired to use the lower set of slides for field selection and to associate them with the pins 53 relating to the upper zone of the card. Of course this relation may be reversed if desired. The usual retract mechanism 55 is provided for both sets of slides. An examination of Fig. 1 will shown that when the master card is sensed the upper zone pins 53 will be locked up by the lower set of slides 54 and the lower zone pins 53 will be locked up by the upper set of slides. However for field selection, it is desired to normally hold all lower slides retracted and to release to effective locking position only those related to a particular field or fields of the master card. Remembering, as previously stated, that the master card is divided up into separate fields and that control holes in either card, but generally the lower, determine which field of data is selected to be transferred to the lower detail card, there has been provided a series of latch plates 56 (see Figs. 1, 3, and 4) having downwardly extending hooked ends 57 which are adapted to extend into notches 58 in the front end of the slides of whatever set the latch plates are associated with, in this case the lower set. The width of these plates is determined by the width of the columnar field in the card which they are to control. In a typical example the master card may be divided up into eleven fields of four columns each, leaving the 45th, 90th columns open for control hole use. These plates 56 are loosely pivoted on a cross shaft 59 which at its ends is journalled in a bracket member 60 fastened to the front face of the set pin box 37. The opposite end of each latch plate is in the form of an upturned forked arm 61 engaged by a pin 62 on the end of an armature 63 pivotally supported on a frame 64 which also supports a magnet coil 65. This frame is bolted to the bracket member 60. Suitable wires are connected to terminals 66 in back of the magnets as will be clear from a subsequent consideration of the circuit operations.

An L-shaped bail plate 67 is fixed at each end to the shaft 59, and the upper edge thereof lies just under the latch plates as clearly seen in Fig. 1. When the shaft is rocked this edge is lifted to lift the latch plates 56 to release all the slides normally held thereby. A cover plate 68 supported on bracket member 60 extends over the tops of the magnets and associated structure. It is clear that when a magnet coil 65 is energized it will lift the associated latch plate and release that group of slides to permit them to lock up the associated set pins 53 when the upper card is sensed, and that when the bail lifts all the latch plates these released slides may act in the usual manner without regard to field selection.

Selector control switch and operation

Figure 4:
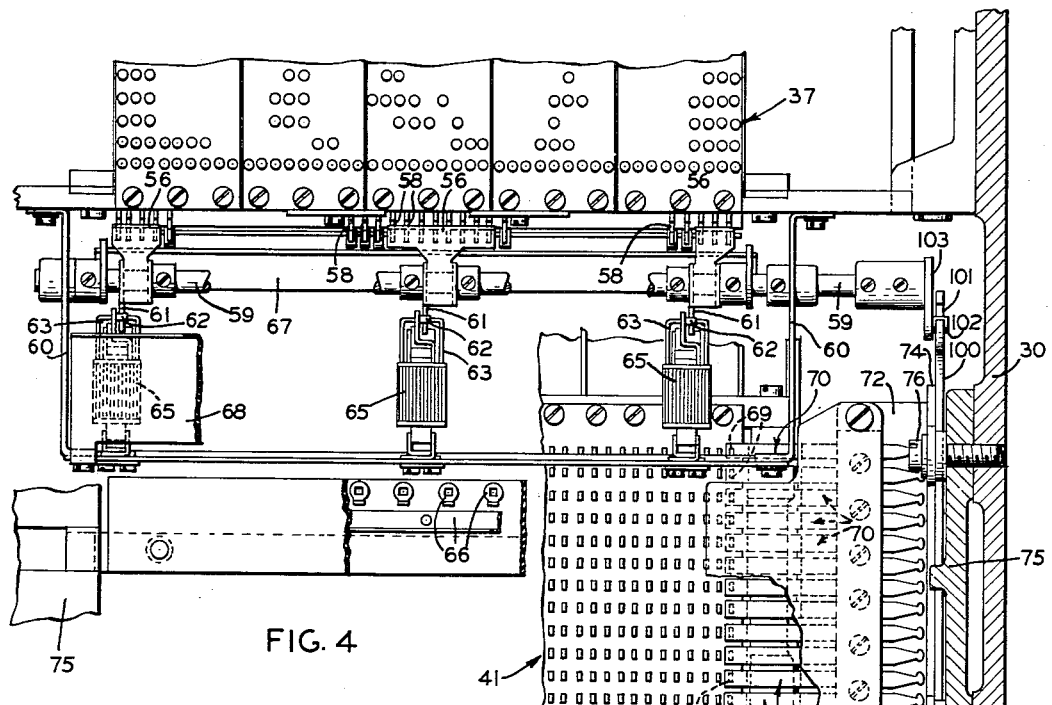
Fig. 4 is a partial horizontal cross section taken on the line 4—4 of Fig. 3 further showing the selector control switch and the actuator magnet construction, with portions broken away.

As above set forth when predetermined fields or groups of slides are to be freed for locking-up selected fields of set pins, certain magnets must be energized. To do this selectively there is a provided a selector control switch shown in Figs. 3, 4, 9, 9A, 10, 10A, 11, 11A, 12, and 13. In Figs. 3 and 4 there is clearly shown the front section 41 of the comparing unit and over the twelve pins 69 thereof in the last column to the right of the upper face of the unit are disposed twelve pairs of superposed switch contacts 70 normally open but respectively adapted to be closed when the associated pin is lifted. This column of pins 69 corresponds to the 45th, 90th column of the master card. These pins are actuated by the intermediary of control holes in either card. If they are in the master card, they must be in the 45th, 90th columns thereof since the other columns are reserved for the field data to be selected. If the control holes are in the detail or lower card they may be disposed anywhere therein as desired since the related connections may be wired to this column of pins in the comparing unit nevertheless.

The switch contact pairs 70 are disposed between a series of insulating strips 71 suitably disposed across the forwardly bent ears 72 of a supporting plate 73 which is slidably supported adjacent the face of a plate 74 which is bolted to a side frame member, 75 at 76 as shown in Fig. 4. Headed studs 77 are fixed to plate 74 and extend through slots 78 in the plate 73 to permit regulated vertical adjustment of the plate 73 with respect to plate 74. An insulating cover plate 79 is suitably supported above the bank of insulating strips to protect them and the contacts from physical damage.

In order to raise and lower the plate 73 (Fig. 9) so as to raise and lower the switch contacts 70, a pivoted two piece arm is provided with a main portion 81 pivoted at 80. This main portion 81 is disposed back of plate 74 which has a slot 82 (Fig. 9A) therein to receive a stud 83 fastened to arm 81 which stud at its end is received in a horizontal slot 84 in the plate 73. When the arm 81 is rocked around its pivot point 80 it will, through the stud 83 raise and lower the plate 73 and consequently the switch contacts 70. The other piece of the plate elevating arm is arm 85 having spaced headed studs 86 and 87 thereon and a plain stud 88. Stud 86 rides in slot 89 in arm 81 and studs 87 and 88 ride in an elongate slot 90 in arm 81. A spring 91 is tensioned between pin 92 on arm 85 and pin 93 on arm 81 and tends to move arm 85 to the left (Fig. 9) at all times. Adjacent stud 88 on the edge of the lower portion of plate 74 are a series of spaced notches 94 in which the stud 88 bears to hold the arm 81 in either an upper, an intermediate, or a lower position. The outer end of arm 85 is bent at right angles as at 95 to extend over the front of the frame 30 on which is fastened (Fig. 3) a plate 96 bearing labels indicating the positions of the switch contacts. This plate is labelled "Inoperative," "Lower Card," and "Upper Card." Figs. 9 and 9A show the switch elements in their upper or "Inoperative" position so that the elevation of any pin 69, whether due to a control hole in the upper or lower card will not be able to close a contact. Figs. 10 and 10A show the switch contacts in their intermediate or "Lower Card" position in which case only pins 69 activated by lower card control holes may close the switch contacts. This is because pins 69 elevated as a result of lower card sensing have a full stroke whereas such pins elevated as a result of upper card sensing have only a half stroke as fully described in the patent to Braun 2,211,094. Figs. 11 and 11A show the switch contacts in their "Upper Card" or lowest position in which case pins elevated as a result of upper card control holes can close the contacts as well, of course, as those elevated as a result of lower card sensing. It is therefore clearly apparent that a simple setting of this switch mechanism enables the circuit to be made ineffective, to be operated by lower card sensing only, or to be operated by either lower or upper card sensing. In order to open the entire field selecting circuit when the switch is in its upper position and to close the circuit when the switch is in either of its two other positions, a microswitch element 97 is suitably disposed below the arm 81 on the side of plate 74 and has a spring arm 98 adapted to be actuated by a stud 99 on the side of plate 73. These elements are so related that in the position of Fig. 9 the stud 99 is out of contact with spring 98 but in the other two positions shown in Figs. 10 and 11 contact is made and the microswitch is closed. The position of this switch in the main circuits will be shown in the description of them to follow.

In order to lift the latch plates 56 and release their associated slides when the switch is in inoperative position an extension 100 of arm 81 on the other side of pivot point 80 has a forked end 101 to receive a pin 102 on an arm 103 fixed to shaft 59 to which bail 67 is fastened. In Fig. 11 the bail is in its lowermost position; in Fig. 10 it is in a slightly higher position but not yet lifting the latch plates 56; and in Fig. 9 the arm 100 has rocked the bail so as to lift the latch plates and release the slides. Thus when the selector switch is placed in inoperative position the main circuit is opened, the contacts can not be closed by any comparing pin, and all slides 54 are released to lock up the associated set pins 53 in the usual normal manner when the upper card is sensed.

In certain types of selecting operations which may be nominated "zone selection" means are provided whereby, when any one of several pins are lifted in the comparing unit as a result of control hole sensing in either card, a group of associated contacts may be closed for reasons which will appear in the discussion of the "zone" type of circuit. To this end a clamp device is formed as shown in Figs. 12 and 13. It comprises two strips of non-metallic material 104 and 105 cut-out to tightly clamp around at least one pin 69 and to extend beyond this pin on either side to loosely surround other pins whereby the clamp member may be lifted and close several switch contacts by the lifting of one pin. The strips 104, 105 are clamped together on the tops of the pins beneath the contacts by means of bolts 106. The form shown in Figs. 12 and 13 shows a clamp for tightly engaging two adjacent pins 69 at their tops and extending to surround two oppositely adjacent pins so that when either of the two clamped pins are elevated four contacts are closed with the circuit results later described.

*Master card slide retract mechanism*
*(Figs. 16, 17, and 18)*

This is of the general form shown in Figs. 44, 45, and 46 of the Braun patent. It is operated by a front cam shaft 52 which at its left end has a retract cam operating in timed manner upon a followmer roller 107 on pivoted arm 108 connected to link 50 adapted to lift arm 109 loosely pivoted to a rock shaft 110. This arm is adapted to be engaged by a spring urged pawl 111 which is notched to rest on a shoulder of arm 109. This pawl is pivoted at 112 to a plate 113 secured fast to shaft 110 which is suitably connected to a link (#410 in Braun patent Fig. 44) to retract the upper slides when the pawl is in engagement with the arm 109. When it is desired to retain the set-up of the slides the mechanism in the Braun patent, thus referred to, permits the pawl to be moved out of engagement with the arm 109, as shown in Fig. 18 herein, by means of a stud pin 114 on an arm 115 secured to a shaft together with an arm 116 which is operated by a link 117 connected to the usual well known cam control mechanism shown clearly in the designated figures of the Braun patent.

For reasons connected to the particular nature of field selection it is desirable that the locking slides 54 be retracted each cycle and therefore the present invention provides means for disabling the stud pin 114 when field selection is being employed. This includes mounting the stud pin 114 in a casing 118 on arm 115 and containing a spring 119 therein to urge the pin to the right (Fig. 17). However the pin has an outer knob 120 whereby it can be pulled to the left to withdraw the pin from the path of pawl 111 and held in this position by reason of a bayonet and slot construction indicated at 121. When the pin is turned to allow the bayonet pin to enter the slot the pin moves to the right and lies normally in the path of the pawl 111, and when it is pulled to the left and the bayonet pin turned to rest on the end of the casing it is withdrawn from the path of the pawl 111. Thus when the pin 114 is withdrawn the pawl is always in engagement with the arm 109 and plate 113 is moved each cycle to retract the field selection locking slides 54.

*Clutch operated switch*

In Fig. 16 is also shown the well known clutch mechanism including the arm 51 (see arm 146 Fig. 16 of the Braun patent) which is moved down when the drive shaft is connected to the power. Beneath this arm is a microswitch 122 suitably mounted so that when the arm 51 is moved down a button or spring 123 on the switch is pressed to close the switch. The relation of this switch to the circuit is set forth in the circuit descriptions.

*Timing cam operated switch*

On the opposite end of shaft 52, see Fig. 19, is fastened a timing cam 124 having a high point 125 adapted to engage and move a pivoted plate 126 through a contact roller 127 thereon. This plate is mounted in association, in any suitable manner, with a pair of normally open contacts 128 which are closed for a predetermined interval each cycle by the cam high point. The relation of this switch to the rest of the circuit will appear from the circuit description.

*Decoding relays*

In Fig. 20 are shown a pair of decoding relays 129 and 130 which are mounted as shown on the right side frame 30 inside a cover (not shown). These relays actuate contacts in the circuit when a special code of control holes such as the Powers 90 column numeric code is employed and the relation of these relays and their contacts to the circuits with which they are associated is clearly set forth in the circuit description.

*Master cards (field selection)*

In Fig. 14 is shown a master card prepared for use with field selection and two views of the upper zone of a detail card into which data from the upper zone of the master card are transferred by the herein mechanism. The master card 131, in the example illustrated, has its upper zone divided into eleven fields which are punched in accordance with increasing units of price or pay or other value so that the one master card can be used with any number of matching detail cards which relate to the same unit value.

The detail card 132 in the view of it just below that of the master card 131 shows the detail card punched with data relating to the date, the customer, the class of goods, the item number, and the quantity. The number five position has been punched in the quantity column indicating that for that customer five units of goods are called for to be punched in the right hand columns of his card under Price, Unit, and Extension. The data for the unit price is wired directly from card to card but the price for the selected number of units is selected by the control hole in the five position in the quantity column. It is to be remembered that a number of detail cards may be matched with the one master card and each one may have a different number in the quantity column so that the master card is held in the machine to take care of all the matching detail cards. The means for holding the master card on "match" relations is well known and is clearly shown in the Braun patent.

In the view of the detail card at the bottom of Fig. 14, it is shown as having been punched with the unit price and the cost of the desired number of units in the extension column. The only information transferred from the master card to the detail card by selective action through the novel wiring unit to be described is the cost data from the selected field. All the remainder of the information is transferred by usual and direct wiring.

*Mast. card (zone field selection)*

In Fig. 15 is shown the upper zone of a master card 133 and a detail card 134 to be punched by field selection transfer from one to the other. The master card is divided into fields A and B each having a shelf price column for goods in that zone and the price for one and two units of those goods such units being, for example, a case or a gross. The card also has columns representing the cost to the company and the weight of one and two units. Therefore if two units of goods in field B are selected by suitable control punching in the detail card, the price of two units plus its cost and weight will be punched therein. The particular manner in which the field selection is made will be clear from the circuit description relating to that form of system. The lines shown extending from the master to the detail card indicate the flexibility of the system in that the data punched in the detail card may be punched therein in any columns in accordance with the wishes of the operator. It is shown that the cost data may even be Y-wired into two columns of the detail card.

*Wiring unit (field selection)*

Figs. 5, 6, 7, and 8 illustrate the novel form of wiring unit 47 which has been modified to enable any one of a group of master card data fields to be transferred to the detail card. To this end the frame of the unit has as usual upper portion 135 supporting pins 136 adapted to be depressed by the pins 53 in the rear section 42 of the comparing unit. It also has a lower portion 137 supporting pins 138 adapted when actuated to move the set-up pins in the punch set-up box 38. For ordinary purposes the pins 136 and 138 are directly wired as usual by Bowden wires and as indicated by number 139. However, for field selection, and since the upper zone of the master card is to be used for this purpose, the wiring unit has been modified. The side plates 140 have been rearwardly extended as at 141 and support on and therebetween a series of vertical spaced plates 142, 143, 144, 145 and 146. The plates 142 and 143 are adapted to support the ends of the Bowden wire cables 147 and the plates 144 and 145 are adapted to support set pins 148 connected to the ends of the Bowden wires and urged to remain in normal retracted position by springs 149. These pins 148 are connected by Bowden wires to the pins 136 related to the upper zone positions of the master card as shown by Bowden wires 150 and 151. When they are actuated by the Bowden wires they are moved rearward against their spring resistance and press against the wider portions of a series of pivoted plates 152 mounted on supporting rods 156. The narrower portions of these pivoted plates on the other side of the pivot axis are related to pins 153 connected to Bowden wires 154 leading to desired positions in the lower portion 137 of the wiring unit to actuate pins 138 therein to effect desired punching in the detail card below. These pins 138 are held in normal retracted positions by springs 155 so that they, through said springs hold the pins 153 in their normal rearward positions as shown in Fig. 5.

Figure 7:
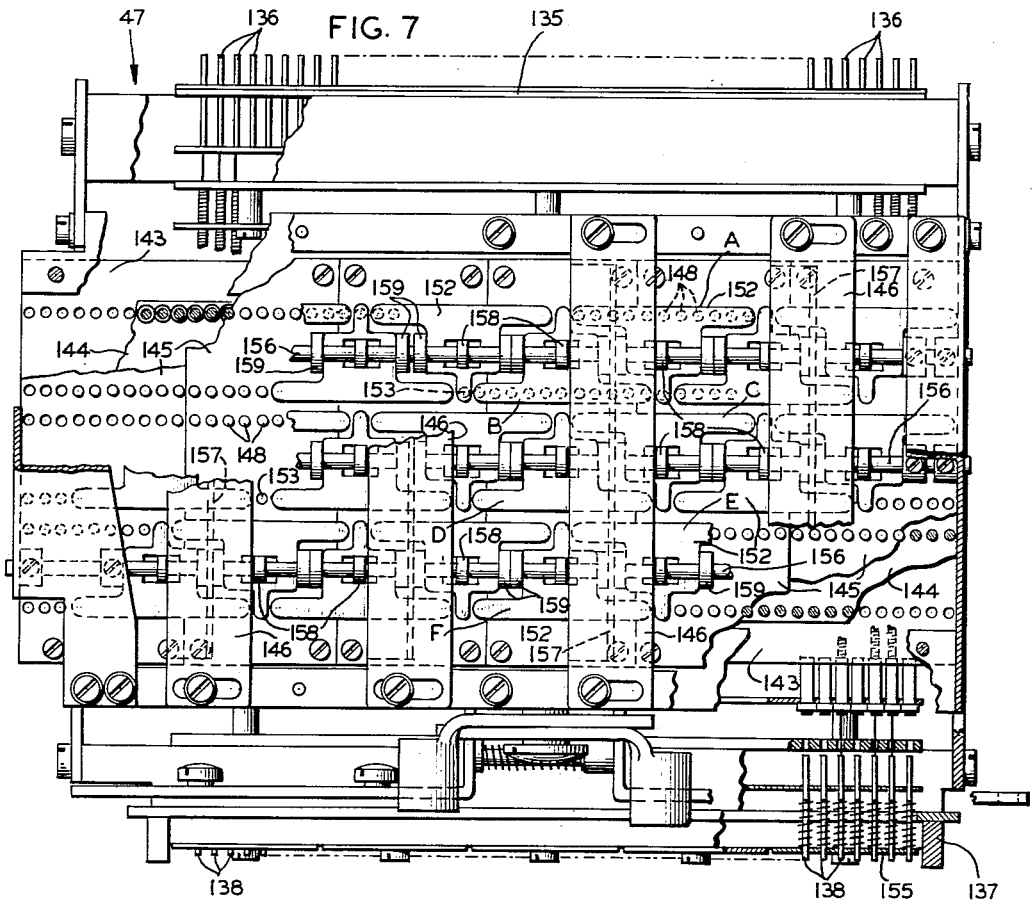
Fig. 7 is an enlarged rear elevation of the improved wiring unit with parts broken away, showing one arrangement of pivoted plates.

The paddles or pivoted plates 152 in the example shown in Fig. 7 are somewhat T-shaped and there are six horizontal rows of pivoted plates and four plates in each horizontal row it being understood that two rows are carried by each rod 156, the plates of each said two rows being mounted in alternate and inverse relation to each other for space saving reasons. This covers positions 0, 1, 3, 5, 7, and 9 in each column. Having four plates in a row is required because we have four columns in each field. The width of the wider portions of each pivoted plate is sufficient to receive eleven wirth from the upper pins 136 because we have eleven fields in the card each of four columns. These pivoted plates 152 are loosely mounted on the three shafts or rods 156. These rods are suitably fastened at their ends in the side plates of the frame of the unit. The rear frame plates 146 are spaced apart as shown in Fig. 7 and have forwardly extending forked lugs 157 which loosely embrace and stabilize the rods 156 between their ends. The pivoted plates 152 are of the shape shown and their center portions are reversely bent by stamping to provide curved bearings 158 to permit the plates to be slipped on to the rods 156 and rotate loosely and freely thereon. On the rods 156 the pivoted plates 152 are held in spaced relation by intervening spacing washers 159.

Considering that we have forty-four columns of the upper zone of the master card to be employed for field selection, in the example illustrated in Figs. 7 and 14, we have established eleven fields of four columns each. In order that data from any of the selected fields may be transferred to the selected field or fields in the lower detail card and, since each detail card control hole may select a different field of the master card as it enters the machine, corresponding data positions in related columns of each master card field are connected to one pivoted plate on one side of the pivot axis and the other side is connected to the corresponding data position in the related column in the field or fields of the detail card. To explain this more fully let us take the pivoted plates lettered A, B, C, D, E, and F in Fig. 7. As heretofore mentioned, for space saving reasons adjacent plates 152 are reversed in their position on the rods 156. Plate A is connected by eleven wires to pins 136 associated with the zero hole in the second column of each master card field. Plate B is connected by eleven wires to pins 136 associated with the one position in the second column of each field. Plate C is connected by eleven wires to pins 136 associated with the three hole in the second column of each field. Plate D is connected by eleven wires to pins 136 associated with the five hole in the second column of each field. Plate E is connected by eleven wires to pins 136 associated with the seven hole in the second column of each field. Plate F is connected by eleven wires to pins 136 associated with the nine hole in the second column of each field. The portions of these plates on the opposite side of the pivot axis are connected to pins 138 associated with corresponding positions in the second column of the field of the detail card. Viewing Fig. 7 the offset vertical row of plates 152 to the right of those lettered are associated with respective holes in the first column of each field. The offset vertical rows of plates 152 to the left of those lettered are associated with respective holes in the third and fourth columns of each field. Thus one plate will respond to a hole in the same data position in each field and transmit this data to the corresponding hole in the detail card. The wires 154 may if desired be Y-wired to two or more fields in the detail card but one wire is generally preferable.

Figure 8:
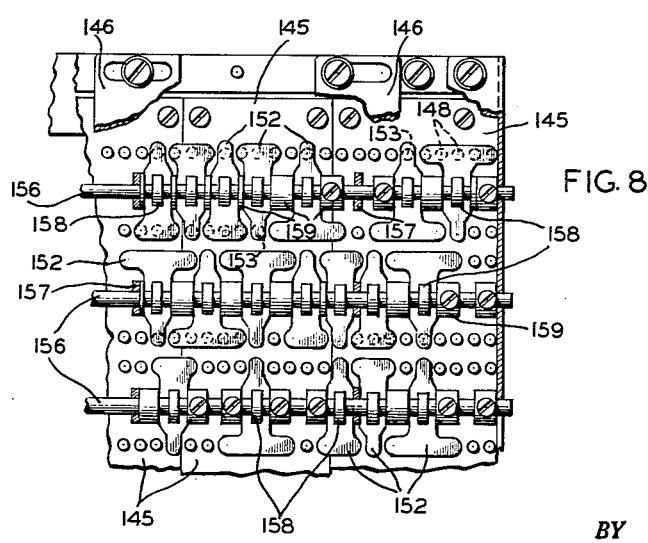
Fig. 8 is a smaller similar view showing another arrangement of the pivoted plates.

In Fig. 6 is shown one of the pivoted plates in its operated position. In Fig. 8 is shown a different arrangement of plates of somewhat different dimensions. Examining the top row of plates from right to left it will be seen that some of the plates are connected to five wires, and some to three wires. The size and shape of the plates are determined by the number of fields into which the master card is divided and the number of columns in each field and this is governed by the demands of the particular accounting problem to be handled.

*Independent control system (single control hole)*

In this system each field is selected by means of a single control hole, although several fields may be punched simultaneously by the use of a corresponding number of control holes. This sort of system is exemplified in the circuit shown in Fig. 21 in which are nominated several essential elements as follows: Fuse box, Motor outlet, Main switch box, Clutch-actuated switch, Transformer, Rectifier, Timing switch, Operative-inoperative switch, Selector control switches, Terminal strips A and B, Slide actuator magnets.

With the main switch closed the motor is started and the clutch-actuated switch 122 is then closed to energize the transformer primary coil. When the Operative-inoperative switch 97 is open, which it is when the selector control arm 85 is disposed in its "Inoperative" position nothing further happens as far as the field selection circuit is concerned. In this position of the said arm, the bail 67 has lifted the actuator magnet latch plates 56 to release the locking slides 54 of the lower set so that these slides can operate in the usual fashion. However, when the control arm 85 is moved to one or the other of its operative positions, then the said switch is closed and the A. C. current from the transformer secondary is applied to the rectifier over wires 15 and 16 through terminal strips A and B. Assuming the single control hole is employed to select field eight of the master card, the pin in the front comparing unit as above described, will lift and close selector switch eight making circuit as follows: wire 17 at rectifier, terminal strip A, to timing cam switch 128, which is timed to close after the control switches are closed, over wire 13, terminal strip A to terminal strip B, to the eight selector control switch 70, connection eight on terminal strip B, to actuator magnet 65 for field eight, over wire 14, through terminal strips B and A, to the negative D. C. side of the rectifier.

In the example shown there are eleven actuator magnets and they may control eleven fields of four columns each or any other desired number of field columns totaling forty-four, or forty-five if the control holes are in the detail lower card. Of course it is clear the several control holes may be used to select more than one field but the above example is representative of a plurality of field selection operations.

*Independent control system (powers 90 column code)*

In this system each field is selected by means of one or two holes in accordance with the above well-known shown in Fig. 22 in which are nominated several essenoperated switch, Main switch box, Transformer, Rectifier, Timing cam switch, Terminal strips A, B, and C, Decoding relays and circuits, Operative-inoperative switch, Selector control switches, Slide actuator magnets and a chart.

When the main switch is closed the motor starts and the clutch actuated switch is closed putting power into the transformer primary coil. If field selection is to take place, the field selector arm 85 is placed in one of its two operative positions so that the inoperative-operative switch is closed thus placing the secondary of the transformer in circuit as follows:

Wire 1, on lower side of secondary coil terminal strip A, terminal strip B, inoperative-operative switch 97, wire 2, terminal strip B, terminal strip A, to the positive side of the rectifier. Since the "Powers" 90 column code is to be used in this example, it is to be noted, in the lower right side of the circuit, that there are employed eleven selector switches 70 and that certain of them are tied together in pairs so that when one is operated the other will be operated, whereas certain others are operated separately. The reason for this will appear as the circuits are traced for an odd numbered field and an even numbered field to be selected. It will be remembered that in the "Powers" code an even number such as six is obtained by punching in the five and the nine positions whereas the number five is obtained by punching only in the five position.

The operative tying together of the selector control switches is effected by means of the clamp members 104, 105 heretofore described, see Fig. 12, which are secured to the upper extremity of selected ones of the comparing pins 69. The clamp members and wiring is so arranged that when, for example, column 17 is employed for field selection control the one position thereof is wired to operate the five and seven selector control switches associated with column 45. The three position of column 17 would be wired so as to operate selector control switches nine associated with column five and switch zero associated with column 90. The five position of control column 17 would be wired so as to operate switches one and three associated with column 90. The seven position of control column 17 would be so wired as to operate the five and seven selector control switches associated with column 90. The nine position of control column 17 would be so wired as to operate the nine selector control switch associated with column 90. The zero position of control column 17 would be wired to operate the three selector control switch associated with column 45. In the event an eleventh field should be required then the zero position of another control column is employed, for example the 16 column which would be wired so as to operate the selector control switch associated with the one position of column 45.

Assuming that we wish to select the five field, sensing of the five control position will close the selector switches in the first and third positions of column 90. When this is achieved by the lifting of the proper pin in the comparing unit through the intermediary of the five control hole in the detail card the circuit thus far traced may be continued as follows:

D. C. (positive) current available from wire 4 at the rectifier, terminal strip A, timing switch, wire 5, terminal strip A, terminal strip B, terminal strip C, wire 17 to the selector switch contacts. As is clear from the circuit drawings, to get the five field from the contacts thereof the comparing unit pins must lift the pins in the first and third position in column 90. When the contacts associated with these positions are closed we can trace the circuits further as follows: From wire 17 above mentioned through selector contacts to wire 26, terminal strip C, wire 33, to closed contact under control of the decoding relay 130, wire 38, terminal strip B, wire 10 to coil of five field magnet 65, wire 3, terminal strip B, terminal strip A back to negative side of rectifier. Thus the field five has its slides released for the sensing of the master card and the set up of the pins in the set-up box according to the data in that field. At the same time over wire 17 we can pass through another contact of the selector switch to wire 18, which contact is tied to the previously mentioned one as indicated by the dotted lines in the circuit drawings (this may be done electrically or mechanically as above mentioned), terminal strip C, wire 19, coil of the decoding relays 129, wire 3, terminal strip B, terminal strip A back to negative side of the rectifier. The decoding relay 129 opens contacts connecting wires 31 and 46 thus opening the circuit to the ninth position selector switch in column 90.

If it is desired to select field number six under this system, then the Remington Rand code calls for the five and nine holes to be punched to designate a six. Therefore the card is punched with two control holes in the fifth and ninth positions and the comparing pins as above described are lifted to close the selector switches in the column 90 ninth position and the first and third positions whereupon the following circuits may be traced: From rectifier over wire 4, terminal strip A, timing switch, wire 5, terminal strip A, terminal strip B, terminal strip C, wire 17, column 90 first position contact, wire 26, terminal strip C, wire 33, to contact controlled by one of the decoding relays. Momentarily we will go back and trace the circuit over wire 17 to the selector switch closed in column 90 position nine. This leads over wire 24, terminal strip C, wire 31, to the decoding relay 130 which lifts all of its contacts from their lower closed positions to their upper closed positions. At the same time over wire 17 we pass through the selector contact in column 90 position three which leads to wire 18, to terminal strip C, wire 19, through the other decoding relay 129 which opens its contacts 31, 46 and thus opens the circuit leading to field nine. Going back to wire 33 previously mentioned, since the decoding relay associated with it has been energized, wire 33 now contacts with wire 39, terminal strip B, wire 11 to the field slide magnet for the field six. Thus the slides in field six are released and lock the set up for field six when the master card is sensed.

*Zone control system (combined control)*

In this system master cards of the type shown in Fig. 15 are used in which the card 133 is divided into different zones with shelf price and extensions for one or two units in each zone and the cost and weight for the same number of units. All this information is distributed on the master card in the upper zone thereof and may be selected by a combinational two hole system in which one hole controls the zone selected and the other hole controls the number of units selected. The circuit for this system is shown in Fig. 23 in which are nominated several essential elements as follows: Fuse box, Motor outlet, Main switch box, Clutch-operated switch, Transformer, Rectifier, Timing cam switch, Terminal strip A, Terminal strip B, Terminal strip C, Inoperative-operative switch, Selector control switches, and a chart showing selected fields and necessary zone and unit-control hole positions on the detail card, for one particular problem.

It will be noted that the selector switches are operatively connected in two groups of three each, one group of four, and two separate single switches by means of the clamping members 104, 105 heretofore described. The single switches thus mentioned are zone control switches and the connected switches are secondary or unit control switches. In this combination or control system two card control positions are employed for zone control selection, which in the illustrative example are the one and the three positions of card column 39, and three card positions are employed for unit control selection, which in the illustrative example are the zero and one positions of card column 86 in addition to the zero position of card column 84. The wiring arrangement is such that the zone control position one in column 39 operates the zero selector switch associated with column 45, while the zone control position three of column 39 operates the one selector switch associated with column 45. The zero unit control position of column 86 operates the three, five, and seven selector switches associated with column 45. The zero unit control position in card column 84 is wired so as to operate the nine selector switch associated with column 45 together with the zero, one and three selector switches associated with column 90. The one unit control position in card index position one of column 86 is so wired as to operate the five, seven and nine selector switches associated with column 90. From the chart in this figure, it will be seen that it is desired to select fields one, two and seven from control holes in column thirty nine, position one and column eighty six, position one. It will be seen that field one relates to the shelf price for one article in zone A; field two relates to the extension price in this zone for one unit (which may be any number of articles such as a case or carton); and that field seven relates to the cost and weight of one unit. With the various main switches closed as above described with respect to the other two circuits, let us assume that the control holes column thirty nine-one, and column eighty six-one in the manner previously described, lift proper pins in the comparing unit to close the related combination of selector switches, one switch in the zero position of column forty five, and three switches in positions five, seven, and nine in column ninety. With the closing of the switch nominated thirty nine-one a circuit may be traced as follows: From positive D. C. side of rectifier, wire 4, terminal strip A, timing cam switch, wire 5, terminal strip B, terminal strip C, wire 6, to selector switch column forty five, zero position, and selector switch column ninety, fifth position. Over the first mentioned switch a circuit leads from wire 7, terminal strip C, wire 8, terminal strip B, wire 9 to the actuator magnet of field one. Over the other switch the circuit proceeds over wire 28, terminal strip C, wire 29, terminal strip B, wire 30, to actuator magnet for field seven. Also over wire 7 we pass through switch in column ninety, seventh position, over wire 13, terminal strip C, wire 14, terminal strip B, wire 15, to actuator magnet for field two. Thus we have selected fields one, two, and seven and released the associated locking slides to hold the set-up according to the data in the corresponding fields in the upper master card. It is to be noted that from these actuator magnets the circuits pass back over wire 3, terminal strip B, terminal strip A to the negative side of the rectifier. It is also to be noted that switches in column forty-five, position zero and column ninety, position five are in parallel over wire 6, and that switch in column ninety, position seven is in series with switch in column forty-five, position zero over wire 7. Thus the circuits for field magnets 1 and 7 are in parallel with each other and the circuit of the magnet of field two is in series with that of magnet 1. Thus field two actuator magnet is dependent upon the closing of field one actuator magnet.

From the chart in Fig. 23 it will be seen that when switch for the thirty nine-one zone control position is operated in conjunction with switches for the eighty four-zero unit control position, fields one, two, seven and nine are made effective. Tracing their circuits would be a repetition of what has already been set forth. It is to be noted however, that in this instance circuits of field magnets 1, 7, and 9 are in parallel whereas the circuit of field magnet 2 is still in series with that of field magnet 1.

With respect to the closing of switches for the thirty nine-one zone control position and eighty six-zero unit control position, it will be similarly observed that the circuits of field magnets 1 and 8 are in parallel whereas in this example the circuit of field magnet 3 is in series and dependent upon the circuit of field magnet 1. Similar connections and circuits may be traced with respect to the control by main zone switch thirty nine-three over unit control group contact switches 84-0, 86-0, and 86-1.

In resume, it is to be noted that when the control combination thirty nine-one, eighty six-one is employed fields one, two and seven are selected and the detail card is punched with the shelf price of one article, and the extension price for one unit in zone A, and with the cost and weight of one unit. When the combination thirty nine-one, eighty six-zero is employed, fields one, three and eight are selected and the detail card is punched with the shelf price of one article, the extension price for two units in zone A, and the cost and weight for two units. Similarly when the combination thirty nine-one, eighty four-zero is employed the fields one, two, seven and nine are selected and field nine causes the detail card to be punched with control holes to regulate the cycling of the tabulator since this set up calls for more than two units. Similar combinations using combinations including switch thirty nine-three are employed since thirty nine-three is the main zone control hole for zone B whereas switch thirty nine-one is the main zone control hole for zone A.

This example is but one of a large number which may be employed showing the flexibility by which the switching arrangements can be altered as desired to comply with and fulfill any accounting requirement.

*Resume of operation*

For another form of example, let us assume that we have a master card with eleven fields punched with different amounts of pay for total hours of work from one to eleven hours at a predetermined rate per hour. Therefore one master card can handle the selection of any number of hours from one to eleven regardless of how many workmen there are. At the end of the day the detail card for each workman is punched with the usual information as to name, etc. and the control hole is punched in it representing the number of hours worked at that rate of pay. There may be many hundreds of workmen's cards thus punched for that rate of pay. There also may be many hundreds of other workmen's cards punched for work at other rates of pay. A master card is already punched for from one to eleven hours of work at every rate of pay in the shop. These master cards are assembled and sorted according to sequence with respect to rate of pay. The detail cards are also sorted in sequence as to rate of pay. These groups of master cards are placed in the upper magazine and the groups of detail cards are placed in the lower magazine in this sorted order. Let us assume that the first master card is for work at $1.25 an hour and the first set of detail cards are for this same rate and each punched with its control hole. As the master card is fed in and the detail card compared with it there is a match and the master card is held in the machine. Since the pin 114 (Fig. 16) is pulled out the master card, although remaining in the machine, will have its locking slide retracted after each detail card is compared.

As the detail card is sensed, the control hole in it will push up a pin in the front section of the comparing unit in the last right hand column as shown in Fig. 4 and will elevate it to close one of the pair of contacts 70 connected to one of the actuator magnets 65 which will energize this magnet and cause its associated latch 56 to be lifted thus releasing the locking slides of that particular field of slides so that when subsequently the master card is sensed this field of set pins is locked up and the data transferred to the desired field of the detail card in accordance with the wiring thereto. The transfer takes place through the intermediary of the novel improved wiring unit shown in Figs. 5, 6, 7, and 8. As shown in Fig. 14 the control hole in the detail card has been punched to select the fifth field which, accordingly, is punched in the detail card.

However if the next detail card is a match, it may be punched to select another field and so on. As long as the detail cards match the desired field is selected and punched until all matching detail cards are punched. The master card set-up for each detail card selection is wiped out by slide retraction each cycle since the next detail card picks its own field to be set-up as above indicated. When the first non-matching detail card comes along it is held in the sensing chamber and a new master card fed in and compared with the new detail card. If a match occurs the process of field selection is repeated. The matching of master and detail cards and their respective retention in or ejection from the machine is all according to well known functions for this type of machine which has already been set for such operations to act automatically under the control cam units forming a regular part of the basic machine, as shown and described in the Braun patent.

In using the Powers two hole code the operation is essentially the same except that in the circuit (Fig. 22) numbers of hours are punched in the detail card in code and the selection of the proper actuating magnet is made by way of the particular circuit set forth.

In respect to the zone system of field selection, where there may be several fields selected, this again is fundamentally the same operation except that through the clamps shown in Figs. 12 and 13 and the particular circuits shown in Fig. 23 the particular field or fields which may be selected from a particular unit control position depends upon which one of the zone control positions is effective in combination therewith.

While I have described what I consider to be a highly desirable embodiment of my invention, it is obvious that many changes in form may be made without departing from the invention, and I do not intend to so limit myself except insofar as I may be limited by the scope of the appended claims.

What I claim and desire to secure by Letters Patent is:

1. A machine for transferring data from one card to another and adapted to operate with one of the cards having a zone thereof divided into fields of data and in which either card is provided with control holes indicative of the fields of data to be selected, and having means to permit said card to remain in the machine for one or more cycles of operation which comprises means for sensing the data of said fields, means for retaining said sensed data, a plurality of latching means for normally disabling said retaining means, means for transferring said sensed data to the other card, and means made effective by the control holes to release one or more of said latching means to permit transfer of data only from selected fields of the first card to the second card.

2. A machine for transferring data from one card to another and adapted to operate with one of the cards having a zone thereof divided into a plurality of fields of data and in which either card is provided with control holes indicative of the fields of data to be selected, and having means to permit said card to remain in the machine for one or more cycles of operation which comprises means for sensing the data in all of said fields, means associated with each field to retain the data sensed, latching means associated with each retaining means to normally disable said retaining means, means for transferring retained sensed data from one card to the other, and means made effective by the control holes to release one or more of said latching means to permit the transfer of data only from selected fields of the first card to the second card.

3. A machine for transferring data from one card to another and adapted to operate with one card having a zone thereof divided into a plurality of fields of data and in which either card is provided with control holes indicative of the fields of data to be selected which comprises a plurality of groups of pin lock-slides, each group corresponding to a field on the card, said groups of slides adapted to lock up associated pins when their fields are sensed, means for normally disabling said slides by groups, and means made effective by the control holes to release one or more of said disabling means to allow one or more groups of slides to lock up their pins when the card is sensed.

4. A machine for transferring data from one card to another and adapted to operate with one card having a zone thereof divided into a plurality of fields of data, which comprises a plurality of groups of pin lock-slides, each group corresponding to a field on the card, said groups of slides adapted to lock up associated pins when their fields are sensed, latch plates for normally holding said slides by groups in disabled position, magnets associated with respective latch plates to hold or release said plates, and means made effective by control means on either card to selectively energize said magnets to release desired latch plates.

5. A machine for transferring data from one card to another and adapted to operate with one of the cards having a zone thereof divided into a plurality of fields of data, which comprises a plurality of groups of pin lock-slides, each group corresponding to a field on the card, said groups of slides adapted to lock up associated pins when their fields are sensed, latch plates for normally holding said slides by groups in disabled position, magnets associated with respective latch plates to hold or release said slides, a plurality of switch contacts connected to said magnets, and means made effective by control means in either card to selectively close said contacts to selectively energize said magnets to release the desired latch plates.

6. A machine for transferring data from one card to another and adapted to operate with one of the cards having a zone thereof divided into a plurality of fields of data, which comprises a plurality of groups of pin lock slides, each group corresponding to a field on the card, said groups of slides adapted to lock up associated pins when their fields are sensed, latch plates for normally holding said slides by groups in disabled position, magnets associated with respective latch plates to hold or release said slides, a plurality of switch contacts connected to said magnets, means made effective by control means in either card to selectively close said contacts to selectively energize said magnets to release the desired latch plates, a support for said contacts having positions in which it may be adjusted to render said contacts operative or inoperative, and bail means associated with said support and said latch plates to lift said latch plates to release all the slides controlled by them when the support is in inoperative position.

7. A machine for transferring data from one card to another which comprises a plurality of pin lock slides, a plurality of pivoted latch plates to control the enabling or disabling of said slides, magnets associated with said plates, switch contacts associated with said magnets and adjustable to operative or inoperative positions, and means associated with said contacts to disable the control of the latch plates over the slides when the contacts are in inoperative position.

8. A machine for transferring data from a master card to a detail card and adapted to operate with the master card having a zone thereof divided into fields of data and control holes in the detail card indicative of the fields to be selected and having means to permit the master card to remain in the machine for one or more cycles of operation, which comprises means for sensing the data in said fields, a set-pin box including a plurality of pin locking slides to receive and lock up the sensed data, a plurality of means normally disabling all the slides of the box, means for feeding a series of matched detail cards to receive data sensed in the master card, a plurality of means for releasing the slide disabling means, and means made effective by the control holes to selectively activate one of the releasing means to select the field data of the master card to be transferred to the detail card.

9. A machine for transferring data from a master card to a series of matched detail cards and adapted to operate with the master card having a zone thereof divided into fields of data and having control holes in the detail cards indicative of the fields to be selected and having means to permit the master card to remain in the machine as long as there are matched detail cards passing therethrough, which comprises means for sensing the data in said fields, a set-pin box including a plurality of locking slides to receive and lock up the sensed data, and means selectively acting on the locking slides and made effective by the control holes to determine the data of which field of the master card is to be transferred to the detail card as each detail card is fed into the machine to receive the selected data.

10. A machine for transferring data from a master card to a detail card and adapted to operate with the master card having a zone thereof divided into fields of related data and having a control hold in each matched detail card indicative of the fields to be selected and having means to permit the master card to remain in the machine for one or more cycles of operation, which comprises means for sensing the data in said fields, a set-pin box including a plurality of locking slides to receive and lock up the sensed data, a plurality of means normally disabling all the slides in the zone of the box, means for feeding a series of matched detail cards to receive data sensed in the master card, a plurality of means for releasing the slide disabling means, means made effective by the control holes to selectively activate one of the releasing means to select the field of data of the master card to be transferred to the detail card, and a wiring unit to effect the transfer of the sensed selected data and including a series of pivoted plates in the unit, each plate on one side of the pivot axis being associated with positions corresponding to corresponding positions in the fields of the group of fields in the master card, and each of the plates on the other side of the pivot axis being associated with the corresponding position of one field in the detail card.

11. A machine for transferring data from a master card to a series of matched detail cards and adapted to operate with the master card having a zone thereof divided into fields of data and control holes in the detail cards indicative of the fields to be selected and having means to permit the master card to remain in the machine as long as there are matched detail cards passing therethrough, which comprises means for sensing the data in said fields, a set-pin box including a plurality of locking slides to receive and lock up the sensed data, a plurality of latching means to lock up said slides in selected groups, means associated with said latching means and made effective by the control holes to determine the data of which field of the master card is to be transferred to the detail card as each detail card is fed into the machine to receive the selected data, and a wiring unit to effect the transfer of the sensed selected data and including a series of pivoted plates in the unit, each plate on one side of the pivot axis being associated with positions corresponding to corresponding positions in the fields of the group of fields in the master card, and each of the plates on the other side of the pivot axis being associated with the corresponding position of one field in the detail card.

12. A machine for transferring data from a series of sequentially arranged master cards to a series of sequentially arranged detail cards, in which the master cards have a zone thereof divided into fields of related data and in which each master card is held in the machine as long as there is a match between it and the detail cards passing therethrough, and in which the detail cards have control holes therein indicative of the field to be selected and transferred from the master card to the detail card, which comprises means made effective by the control hole in each detail card to cause the selective sensing only of the desired field of the master card and the transfer of its data to any desired field in the detail card, and a wiring unit to effect the transfer of the sensed selected data and including a series of pivoted plates in the unit, each plate on one side of the pivot axis being associated with positions corresponding to corresponding positions in the fields of the group of fields in the master card, and each of the plates on the other side of the pivot axis being associated with the corresponding position of one field in the detail card.

13. A machine for transferring data from one card to another and adapted to operate with one of the cards having a zone thereof divided into fields of data and control holes in either card indicative of the fields to be selected and having means to permit said card to remain in the machine for one or more cycles of operation, which comprises means for sensing the data of said fields, means for retaining said sensed data, a plurality of means for normally disabling said retaining means, means made effective by the control holes to release one or more of said disabling means to permit transfer of data only from selected fields of the first card to the second card, and a wiring unit to effect the transfer of the sensed selected data and including a series of pivoted plates in the unit, each plate on one side of the pivot axis being associated with positions corresponding to corresponding positions in the fields of the group of fields in the first card, and each of the plates on the other side of the pivot axis being associated with the corresponding position of one field of the second card.

14. A machine for transferring data from one card to another and adapted to operate with one card having a zone thereof divided into a plurality of fields of data and control holes in either card indicative of the fields to be selected and having means to permit said card to remain in the machine for one or more cycles of operation, which comprises means for sensing the data in all of said fields, means associated with each field to retain the data sensed, means associated with each retaining means to normally disable said retaining means, means made effective by the control holes to release one or more of said disabling means to permit the transfer of data only from selected fields of the first card to the second card, and a wiring unit to effect the transfer of the sensed selected data and including a series of pivoted plates in the unit, each plate on one side of the pivot axis being associated with positions corresponding to corresponding positions in the fields of the group of fields in the first card, and each of the plates on the other side of the pivot axis being associated with the corresponding position of one field in the second card.

15. A machine for transferring data from one card to another and adapted to operate with one of the cards having a zone thereof divided into a plurality of fields of data and control holes in either card indicative of the fields to be selected, which comprises a plurality of groups of pin lock-slides, each group corresponding to a field on the first card, said groups of slides adapted to lock up associated pins when their fields are sensed, means for normally disabling said slides by groups, means made effective by the control holes in either card to release one or more of said disabling means to allow one or more groups of slides to lock-up associated pins by the sensing of the card, and a wiring unit to effect the transfer of the sensed selected data and including a series of pivoted plates in the unit, each plate on one side of the pivot axis being associated with positions corresponding to corresponding positions in the fields of the group of fields in the first card, and each of said plates on the other side of the pivot axis being associated with the corresponding position of one field of the second card.

16. A machine for transferring data from one card to another and adapted to operate with one of the cards having a zone thereof divided into a plurality of fields of data, which comprises a plurality of groups of pin lock-slides, each group corresponding to a field on the card, said groups of slides adapted to lock up associated pins when their fields are sensed, latch plates for normally holding said slides by groups in disabled position, magnets associated with respective latch plates to hold or release said latch plates, means made effective by control means on either card to selectively energize said magnets to release desired latch plates, and a wiring unit to effect the transfer of the sensed selected data and including a series of pivoted plates in the unit, each plate on one side of the pivot axis being associated with positions corresponding to corresponding positions in the fields of the group of fields on the first card, and each of the pivoted plates on the other side of the pivot axis being associated with the corresponding position of one field in the second card.

17. A machine for transferring data from one card to another and adapted to operate with one of the cards having a zone thereof divided into a plurality of fields of data, which comprises a plurality of groups of pin lock-slides, each group corresponding to a field on the card, said groups of slides adapted to lock up associated pins when their fields are sensed, latch plates for normally holding said slides by groups in disabled position, magnets associated with respective latch plates to hold or release said slides, a plurality of switch contacts connected to said magnets, means made effective by control means in either card to selectively close said contacts to selectively energize said magnets to release the desired latch plates, and a wiring unit to effect the transfer of the sensed selected data and including a series of pivoted plates in the unit, each plate on one side of the pivot axis being associated with positions corresponding to corresponding positions in the fields of the group of fields in the first card, and each of the plates on the other side of the pivot axis being associated with the corresponding position of one field in the second card.

18. A machine for transferring data from one card to another and adapted to operate with one of the cards having a zone thereof divided into a plurality of fields of data, which comprises a plurality of groups of pin lock-slides, each group corresponding to a field on the card, said groups of slides adapted to lock up associated pins when their fields are sensed, latch plates for normally holding said slides by groups in disabled position, magnets associated with respective latch plates to hold or release said slides, a plurality of switch contacts connected to said magnets, means made effective by control means in either card to selectively close said contacts to selectively energize said magnets to release the desired latch plates, a support for said contacts having positions in which it may be adjusted to render said contacts operative or inoperative, bail means associated with said support and said latch plates to lift said latch plates to release all the slides controlled by them when the support is in inoperative position, and a wiring unit to effect the transfer of the sensed selected data and including a series of pivoted plates in the unit, each plate on one side of the pivot axis being associated with positions corresponding to corresponding positions in the fields of the group of fields in the first card, and each of the pivoted plates on the other side of the pivot axis being associated with the corresponding position of one field in the second card.

19. A machine for transferring data from one card to another which comprises a plurality of latch plates to control the enabling or disabling of the sensing of selected columns of a card, magnets associated with said plates, switch contacts associated with said magnets and adjustable to operative or inoperative positions, means associated with said contacts to disable the control of the latch plates over the sensing or non-sensing of the card columns when the contacts are in inoperative position, and a wiring unit to effect the transfer of the sensed selected data and including a series of pivoted plates in the unit, each plate on one side of the pivot axis being associated with positions corresponding to corresponding positions in the fields of the group of fields in the first card, and each of the pivoted plates on the other side of the pivot axis being associated with the corresponding position of one field in the second card.

20. A machine for transferring data from one card to another and adapted to operate with one of the cards having a zone thereof divided into a plurality of fields of data which comprises a plurality of magnets adapted to selectively control the fields of which the data is to be transferred, a selector control switch having a plurality of contacts connected to said magnets, a source of power, a power switch in circuit with the magnets, an adjustable support for said contacts and having an inoperative position and operative positions, said power switch and the support being so related that the power switch is open when the support is in inoperative position and is closed when the support is in its operative positions.

21. A machine for transferring data from one card to another and adapted to operate with one of the cards having a zone thereof divided into a plurality of fields of data, which comprises a plurality of groups of pin lock slides, each group corresponding to a field on the card, said groups of slides adapted to lock up associated pins when their fields are sensed, latch plates for normally holding said slides by groups in disabled position, magnets associated with respective latch plates to hold or release said slides, a plurality of switch contacts connected to said magnets, means made effective by control means in either card to selectively close said contacts to selectively energize said magnets to release the desired latch plates, a source of power, a power switch in circuit with the magnets, an adjustable support for said contacts and having an inoperative position and operative positions, said power switch and the support being so related that the power switch is opened when the support is in inoperative position and is closed when the support is in its operative positions, and bail means associated with said support and said latch plates to lift the latch plates to release all the slide controlled thereby when the support is in inoperative position.

22. A machine for transferring data from one card to another which comprises a plurality of latch plates to control the enabling or disabling of the sensing of selected columns of a card, magnets associated with said plates, switch contacts associated with said magnets and adjustable to operative or inoperative positions, a source of power, a power switch in circuit with the magnets, an adjustable support for said contact and having an inoperative and operative positions, said power switch and the support being so related that the power switch is opened when the support is in inoperative position and is closed when the support is in its operative positions, and means associated with the support to disable the control of the latch plates over the sensing or non-sensing of card columns when the support is in inoperative position.

23. A machine for transferring data from one card to another having a comparing unit with pins in columnar relation adapted to be operated upon the sensing of cards in upper and lower levels of the machine, the pins operated from cards in one level moving a lesser distance than those operated by cards in the other level, which comprises a series of switch contacts disposed over a columnar series of said pins and adapted to be closed thereby, a support for said contacts, means for adjusting said support to dispose said contacts at different levels such as an upper level, an intermediate level, and a lower level, the parts being so related that in the upper level no comparing pin can close a contact, in the intermediate level a contact can only be closed by a pin moving a full distance, and in the lower level a contact can be closed by pins moving either a full or partial distance.

24. A machine for transferring data from one card to another having a comparing unit with pins in columnar relation adapted to be operated upon the sensing of cards in upper and lower levels of the machine, the pins operated from cards in one level moving a lesser distance than those operated by cards in the other level, which comprises a series of switch contacts disposed over a columnar series of said pins and adapted to be closed thereby, a support for said contacts, means for adjusting said support to dispose said contacts at different levels such as an upper level, an intermediate level, and a lower level, the parts being so related that in the upper level no comparing pin can close a contact, in the intermediate level a contact can only be closed by a pin moving a full distance, and in the lower level a contact can be closed by pins moving either a full or partial distance, a source of power, a power switch in circuit with said source and said contacts, said power switch and the support being so related that the power switch is opened when the contacts are in the upper level position, and is closed when the contacts are in either of the other levels.

25. A machine for transferring data from one card to another and adapted to operate with one of the cards having a zone thereof divided into a plurality of fields of data and a comparing unit with pins in columnar relation adapted to be operated upon the sensing of cards in upper and lower levels of the machine, the pins operated from cards in one level moving a lesser distance than those operated by cards in the other level, which comprises a plurality of magnets adapted to selectively control the fields of which the data is to be transferred, a series of switch contacts connected to said magnets and disposed over a columnar series of said comparing pins and adapted to be closed thereby, a support for said contacts, means for adjusting said support to dispose said contacts at different levels such as an upper level, an intermediate level, and a lower level, the parts being so related that in the upper level no comparing pin can close a contact, in the intermediate level a contact can only be closed by a pin moving a full distance, and in the lower level a contact can be closed by pins moving either a full or partial distance, a source of power, a power switch in circuit with said magnets and related to said support so that the power switch is open when the support is in its uppermost position, and is closed when the support is in any other position.

26. A machine for transferring data from one card to another adapted to operate with one of the cards having a zone thereof divided into a plurality of fields of data and a comparing unit with pins in columnar relation adapted to be operated upon the sensing of cards in upper and lower levels of the machine, the pins operated from cards in one level moving a lesser distance than those operated by cards in the other level, which comprises a plurality of groups of pin lock-slides, each group corresponding to a field on the card, said groups of slides adapted to lock up associated pins when their fields are sensed, latch plates for normally holding said slides by groups in disabled position, magnets associated with respective latch plates to hold or release said slides, a series of switch contacts connected to said magnets and disposed over a columnar series of said comparing pins and adapted to be closed thereby, means made effective by control means in either card to selectively move said comparing pins to close said contacts whereby said magnets are selectively energized to release the desired latch plates, a support for said contacts, means for adjusting said support to dispose said contacts at different levels such as an upper level, an intermediate level, and a lower level, the parts being so related that in the upper level no comparing pins can close a contact, in the intermediate level a contact can only be closed by a pin moving a full distance, and in the lower level a contact can be closed by pins moving either a full or partial distance, a source of power, a power switch in circuit with said magnets and related to said support so that the power switch is open when the support is in its uppermost position, and is closed when the support is in any other position, and bail means associated with said support and said latch plates to lift the latch plates to release all the slides controlled thereby when the support is in its upper position.

27. A machine for transferring data from one card to another and having a comparing unit with pins in columnar relation adapted to be operated upon the sensing of cards in upper and lower levels of the machine, the pins operated from cards in one level moving a lesser distance than those operated by cards in the other level, which comprises a plurality of latch plates to control the enabling or disabling of the sensing of selected columns of a card, magnets associated with said plates, switch contacts associated with said magnets and disposed over a columnar series of comparing pins, a source of power, a power switch in circuit with the magnets, an adjustable support for said contacts, said power switch and said support being so related that the power switch is opened when the support is in its uppermost position and is closed when the support is in any other position, means made effective by control means in either card to selectively move said comparing pins to close said contacts whereby said magnets are selectively energized to release the desired latch plates, means for adjusting said support to dispose said contacts at different levels such as an upper level, an intermediate level, and a lower level, the parts being so related that in the upper level no comparing pin can close a contact, in the intermediate level a contact can only be closed by a pin moving a full distance, and in the lower level a contact can be closed by pins moving either a full or partial distance, and means operated by the support when moved to its uppermost position to disable the control of the latch plates over the sensing or non-sensing of card columns.

28. A machine for transferring data from one card to another having a columnar series of pins in a comparing unit adapted to be selectively elevated, which comprises a series of switch contacts above the respective columnar pins adapted to be closed by the elevation of the pins, and an element clamped on the upper ends of a plurality of pins whereby when one pin is elevated the others thus clamped will also be elevated.

29. A machine for transferring data from one card to another having a columnar series of pins in a comparing unit adapted to be selectively elevated, which comprises a series of switch contacts above the respective columnar pins adapted to be closed by the elevation of the pins, and a clamping bar adapted to be adjustably clamped to the upper ends of a plurality of pins whereby when one clamped pin is elevated the other clamped pins will also be elevated, the ends of the bar extending beyond the clamped pins and clearing adjacent unclamped pins whereby switch contacts above the certain unclamped pins may be also closed when one of the clamped pins lifts the bar.

References Cited in the file of this patent

UNITED STATES PATENTS

| | | |
|---|---|---|
| Re. 21,133 | Lake | June 27, 1939 |
| 1,319,477 | Lasker | Oct. 21, 1919 |
| 1,691,917 | Braitmayer | Nov. 20, 1928 |
| 1,962,732 | Bryce et al. | June 12, 1934 |
| 1,978,893 | Carroll et al. | Oct. 30, 1934 |
| 2,108,681 | Lasker | Feb. 15, 1938 |
| 2,211,094 | Braun | Aug. 13, 1940 |
| 2,355,389 | Mills et al. | Aug. 8, 1944 |
| 2,413,875 | Lang | Jan. 7, 1947 |